United States Patent
Shimizu et al.

(10) Patent No.: US 9,906,306 B2
(45) Date of Patent: Feb. 27, 2018

(54) OPTICAL TRANSMISSION SYSTEM, TRANSMITTER, RECEIVER, AND OPTICAL TRANSMISSION METHOD

(71) Applicant: FUJITSU LIMITED, Kawasaki-shi, Kanagawa (JP)

(72) Inventors: Takashi Shimizu, Kawasaki (JP); Tsuyoshi Yamamoto, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 107 days.

(21) Appl. No.: 14/728,485

(22) Filed: Jun. 2, 2015

(65) Prior Publication Data

US 2015/0381277 A1 Dec. 31, 2015

(30) Foreign Application Priority Data

Jun. 30, 2014 (JP) .................................. 2014-133897

(51) Int. Cl.
*H04J 14/00* (2006.01)
*H04J 14/02* (2006.01)
*H04B 10/572* (2013.01)
*H04B 10/079* (2013.01)

(52) U.S. Cl.
CPC ......... *H04B 10/572* (2013.01); *H04B 10/079* (2013.01); *H04J 14/0295* (2013.01)

(58) Field of Classification Search
USPC .................. 398/71, 68, 95; 359/124, 127
See application file for complete search history.

(56) References Cited

U.S. PATENT DOCUMENTS

| | | | | |
|---|---|---|---|---|
| 5,894,362 A * | 4/1999 | Onaka | ................ | H04B 10/077 398/34 |
| 6,195,480 B1 * | 2/2001 | Kosaka | ............. | H04B 10/2935 359/337.12 |
| 6,324,318 B1 * | 11/2001 | Suzuki | ................ | H04J 14/0221 385/1 |
| 6,636,668 B1 * | 10/2003 | Al-hemyari | ........ | G02B 6/12007 385/16 |
| 8,625,991 B1 * | 1/2014 | Sindhu | ............... | H04Q 11/0071 372/29.01 |
| 8,699,533 B1 * | 4/2014 | Wach | ................. | H01S 5/02212 372/34 |
| 9,118,411 B1 * | 8/2015 | Schmidt | ............... | H04B 10/035 |

(Continued)

FOREIGN PATENT DOCUMENTS

| JP | 60-22840 A | 2/1985 |
|---|---|---|
| JP | 2009-139734 A | 6/2009 |

(Continued)

*Primary Examiner* — David Payne
*Assistant Examiner* — Pranesh Barua
(74) *Attorney, Agent, or Firm* — Arent Fox LLP

(57) ABSTRACT

An optical transmission system includes: a first light source configured to output a light wave of a first wavelength among a plurality of wavelengths; a second light source configured to output a light wave of a second wavelength; and a first detection section configured to detect abnormality in the light wave from the first light source, wherein upon detection of abnormality, a multiplexed optical signal including an optical signal of a modulated light wave generated using the light wave from the second light source in place of an optical signal of a modulated light wave generated using the light wave from the first light source is transmitted.

18 Claims, 11 Drawing Sheets

(56) References Cited

U.S. PATENT DOCUMENTS

| | | | |
|---|---|---|---|
| 9,389,365 B2* | 7/2016 | Nicholson | H04B 10/506 |
| 2001/0012146 A1* | 8/2001 | Shiozaki | H04B 10/296 |
| | | | 359/337 |
| 2004/0057729 A1* | 3/2004 | Forbes | H04B 10/077 |
| | | | 398/149 |
| 2004/0208569 A1* | 10/2004 | Nabeyama | H04B 10/07 |
| | | | 398/79 |
| 2005/0123296 A1* | 6/2005 | Touma | H04J 14/02 |
| | | | 398/45 |
| 2005/0141892 A1* | 6/2005 | Park | H04B 10/032 |
| | | | 398/71 |
| 2006/0147211 A1* | 7/2006 | Kim | H04J 14/02 |
| | | | 398/72 |
| 2007/0071447 A1* | 3/2007 | Ozaki | H04B 10/25133 |
| | | | 398/147 |
| 2008/0304830 A1* | 12/2008 | Huang | H04J 14/0226 |
| | | | 398/79 |
| 2010/0260496 A1* | 10/2010 | Tosetti | H04B 10/2587 |
| | | | 398/7 |
| 2010/0316391 A1* | 12/2010 | Shastri | H04B 10/801 |
| | | | 398/141 |
| 2011/0156183 A1 | 6/2011 | Liu | |
| 2013/0037692 A1* | 2/2013 | Akiyama | G02F 1/0115 |
| | | | 250/201.1 |
| 2013/0161496 A1* | 6/2013 | Akiyama | G02F 1/0147 |
| | | | 250/227.23 |
| 2014/0016931 A1* | 1/2014 | Meade | H04Q 11/0005 |
| | | | 398/48 |

FOREIGN PATENT DOCUMENTS

| | | |
|---|---|---|
| JP | 2013-41143 A | 2/2013 |
| JP | 2013-513825 A | 4/2013 |
| JP | 2013-126193 A | 6/2013 |
| JP | 2013-157722 A | 8/2013 |

* cited by examiner

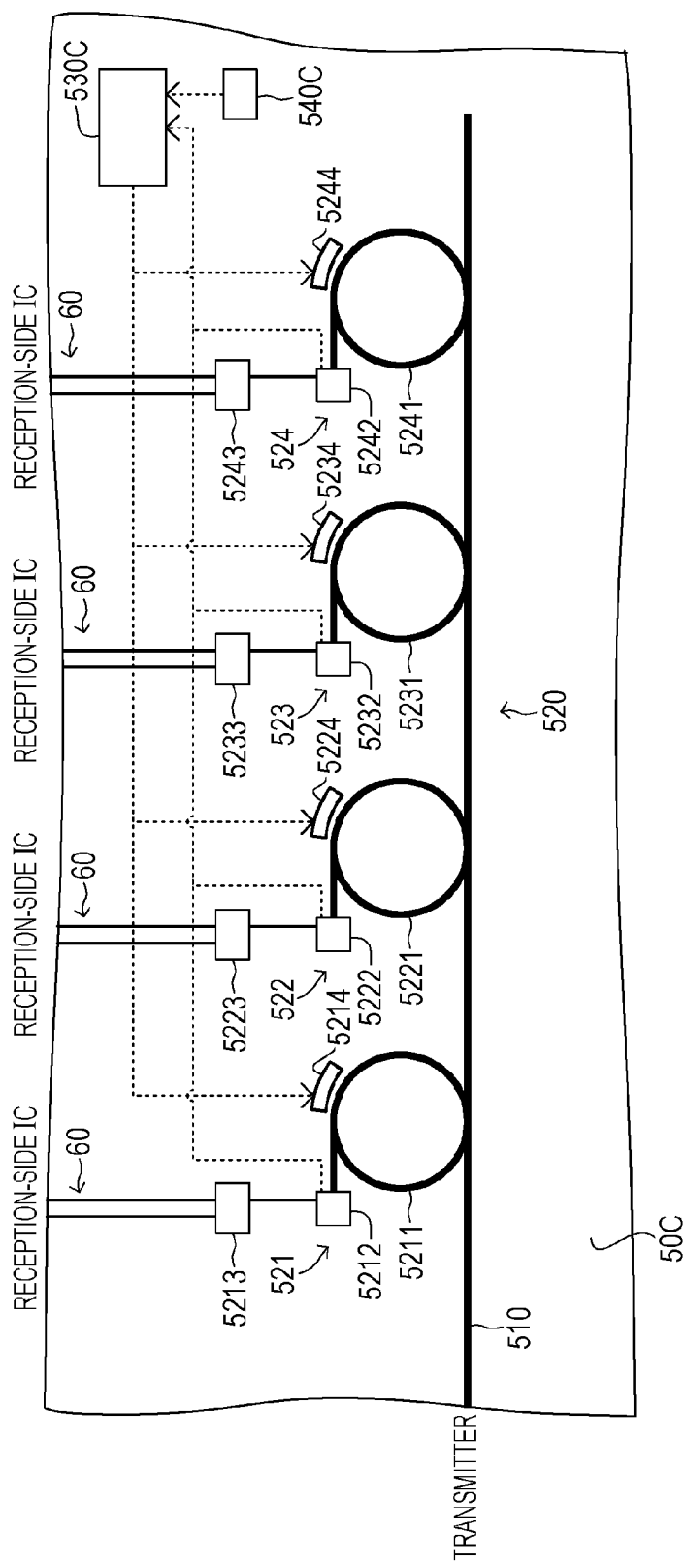

ND STATES PATENT

OPTICAL TRANSMISSION SYSTEM, TRANSMITTER, RECEIVER, AND OPTICAL TRANSMISSION METHOD

CROSS-REFERENCE TO RELATED APPLICATION

This application is based upon and claims the benefit of priority of the prior Japanese Patent Application No. 2014-133897, filed on Jun. 30, 2014, the entire contents of which are incorporated herein by reference.

FIELD

The embodiments discussed herein are related to an optical transmission system, a transmitter, a receiver, and an optical transmission method.

BACKGROUND

In known optical transmission systems, an optical element made of a material containing silicon transmits a multiplexed optical signal composed of optical signals of a plurality of different wavelengths (Refer to Japanese Laid-Open Patent Publication Nos. 2013-041143, 2009-139734, 2013-157722, and Japanese National Publication of International Patent Application No. 2013-513825, for example). Such optical transmission systems can be implemented, for example, using the silicon photonics technique. According to Wikipedia published on the Internet, "Silicon photonics is the study and application of photonic systems which use silicon as an optical medium".

For example, the optical transmission system transmits an optical signal between electric circuits such as CPUs and LSIs. The term CPU is an abbreviation of central processing unit. The term LSI is an abbreviation of large scale integration. The optical transmission system is also referred to as an optical interconnect, for example.

The optical signal transmitted using an optical waveguide is less subjected to degradation in waveform than the electric signal transmitted using a metal wire. Therefore, the transmission of the optical signal allows for a larger transmission line capacity than the transmission of the electric signal.

In the above-mentioned optical transmission system, a light source may be formed of a compound semiconductor such as gallium arsenide, for example. Further, the light source may be disposed near another optical element. Therefore, the light source tends to become hot, degrading itself due to thermal stress and the like. This lowers the optical output level of the light source. For example, as the optical output level of the light source that outputs light of certain wavelength is smaller, the transmission rate, that is, the amount of information transmitted in the light of the certain wavelength per unit time decreases. Accordingly, the transmission rate that is the amount of information transmitted in the multiplexed optical signal per unit time also decreases.

SUMMARY

According to an aspect of the embodiments, an optical transmission system for transmitting a multiplexed optical signal including optical signals of a plurality of different wavelengths by using an optical element made of a material containing silicon, includes: a first light source configured to output a light wave of a first wavelength among the plurality of wavelengths; a second light source configured to output a light wave of a second wavelength; and a first detection section configured to detect abnormality in the light wave from the first light source, wherein the first light source, the second light source, and the first detection section each are made of a material containing silicon, and upon detection of the abnormality, the multiplexed optical signal including an optical signal of a modulated light wave generated using the light wave from the second light source in place of an optical signal of a modulated light wave generated using the light wave from the first light source is transmitted.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a block diagram illustrating a configuration example of a receiver in the first modification example of the third embodiment.

DESCRIPTION OF EMBODIMENTS

Figure 1:
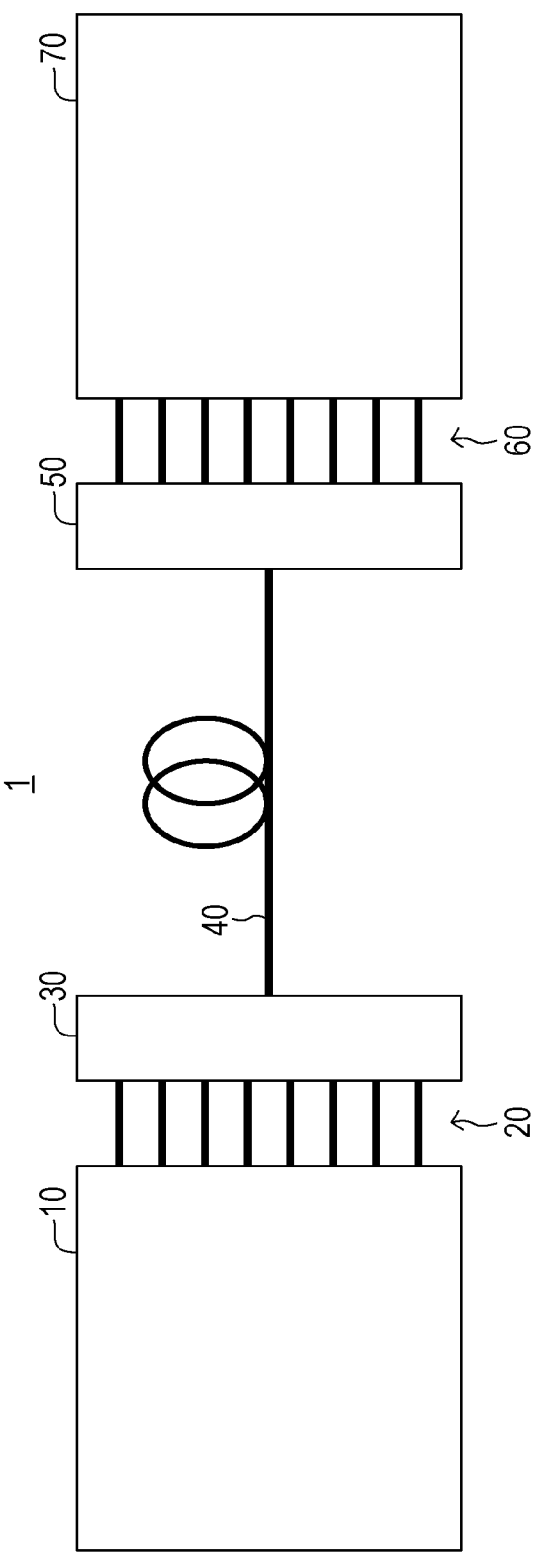
FIG. 1 is a block diagram illustrating a configuration example of an optical transmission system according to a first embodiment.

Embodiments of the present disclosure will be described below with reference to drawings. However, the embodiments described below are exemplary. Accordingly, various modifications and arts that are not specifically disclosed may be applied to the embodiments. The same reference numerals through the drawings referred in the embodiments denote the same or similar components unless otherwise specified.

First Embodiment

Configuration

As illustrated in FIG. 1, an optical transmission system 1 according to a first embodiment includes a first transmission device 30, an optical transmission line 40, and a second transmission device 50. The first transmission device 30 is communicably connected to the second transmission device 50 via the optical transmission line 40. One example of the optical transmission line 40 is an optical fiber.

The first transmission device 30 is connected to a first electric circuit 10 via a plurality of wires 20. Similarly, the second transmission device 50 is electrically connected to a second electric circuit 70 via a plurality of wires 60.

In this embodiment, the first electric circuit 10 and the second electric circuit 70 each are an integrated circuit (IC). The IC may be a CPU. Note that the first electric circuit 10 and the second electric circuit 70 each may be an LSI.

In this embodiment, the optical transmission system 1 is used as an optical interconnect for communicably interconnecting the plurality of electric circuits 10 and 70.

In this embodiment, in the optical transmission system 1, the first transmission device 30 bidirectionally communicates with the second transmission device 50, but the first transmission device 30 may unidirectionally communicate with the second transmission device 50.

For convenience of explanation, it will be now described the configuration and operation of the optical transmission system 1 in which the first transmission device 30 transmits a signal to the second transmission device 50. Transmission of a signal from the second transmission device 50 to the first transmission device 30 is performed in the same manner and thus, description thereof is omitted.

To facilitate understanding, the first transmission device 30, the second transmission device 50, the first electric circuit 10, and the second electric circuit 70 may be referred to as the transmitter 30, the receiver 50, the transmission-side IC 10, and the reception-side IC 70, respectively.

The transmitter 30 receives N transmission electric signals from the transmission-side IC 10 via the plurality of wires 20. In this embodiment, N is 4. N is not limited to 4, and may be any integer of 2 or more. N may be referred to as the number of lanes. The transmitter 30 converts the input N transmission electric signals into N optical signals of different wavelengths. The transmitter 30 transmits a multiplexed optical signal composed of the optical signals of N wavelengths to the receiver 50 via the optical transmission line 40. In this embodiment, the transmission electric signals are differential signals.

The receiver 50 receives the multiplexed optical signal from the transmitter 30. The receiver 50 separates the optical signals of N wavelengths from the received multiplexed optical signal. The receiver 50 converts the optical signals of N wavelengths into N reception electric signals. The receiver 50 outputs the N reception electric signals to the reception-side IC 70 via the plurality of respective wires 60. In this embodiment, the reception electric signals are differential signals.

The transmitter 30 will be further described.

Figure 2:
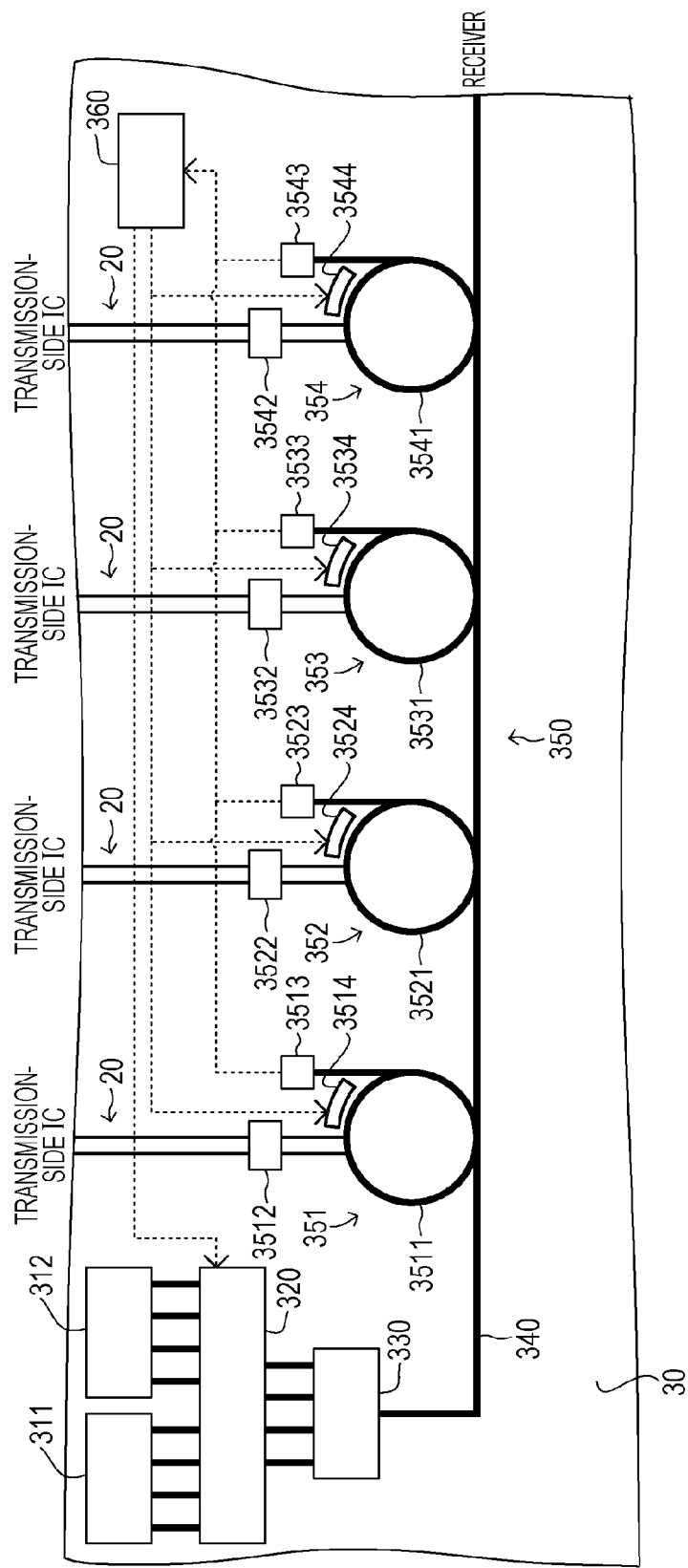
FIG. 2 is a block diagram illustrating a configuration example of a transmitter in FIG. 1.

As illustrated in FIG. 2, the transmitter 30 includes a first light source section 311, a second light source section 312, an optical switch 320, a multiplexer 330, a waveguide 340, a modulation section 350, and a control section 360.

The first light source section 311 outputs light waves of N different wavelengths. In this embodiment, the first light source section 311 is a laser that oscillates at each of N different wavelengths. Examples of the laser include an array laser and a vertical cavity surface emitting laser (VCSEL). The laser may be formed of a compound semiconductor containing crystals of indium gallium arsenide (InGaAs) or gallium arsenide (GaAs).

The "light source" refers to a part of the "light source section", which outputs a light wave of one wavelength. Consequently, in this embodiment, the first light source section 311 includes N different light sources.

Like the first light source section 311, the second light source section 312 outputs light waves of N different wavelengths. In this embodiment, the N wavelengths of light waves output from the second light source section 312 are the same as the N wavelengths of light waves output from the first light source section 311.

Note that the wavelengths of the light waves output from the light sources in the first light source section 311 and the second light source section 312 may vary depending on individual difference and temperature.

The light source in the first light source section 311 is an example of a first light source. The light source in the second light source section 312 is an example of a second light source.

The optical switch 320 receives light waves of N wavelengths from the first light source section 311 and light waves of N wavelengths from the second light source section 312. The optical switch 320 outputs either the light wave input from the first light source section 311 or the light wave input from the second light source section 312 for each of N wavelengths to the multiplexer 330. In other words, the optical switch 320 switches a light wave to be output to the multiplexer 330 between the light wave input from the first light source section 311 and the light wave input from the second light source section 312 for each of N wavelengths.

In this embodiment, at activation of the optical transmission system 1, the optical switch 320 outputs each of the light waves of N wavelengths input from the first light source section 311 to the multiplexer 330.

The optical switch 320 is an example of a first switch.

The multiplexer 330 combines the light waves of N wavelengths from the optical switch 320, and outputs a combined light wave to the waveguide 340.

The waveguide 340 propagates the light wave input from the multiplexer 330 to the optical transmission line 40. The light wave from the multiplexer 330 is a multiplexed light wave composed of unmodulated light waves of N wavelengths. Multiplexing may be expressed as combining or coupling.

The modulation section 350 includes N modulators 351 to 354.

The N modulators 351 to 354 are aligned along the waveguide 340. The N modulators 351 to 354 modulate light waves of N wavelengths #1 to #N in light waves propagated from the waveguide 340 according to the N transmission electric signals input from the transmission-side IC 10.

The modulator 351 includes a ring resonator 3511, a driving circuit 3512, a detector 3513, and a heater 3514. The modulator 351 may include a cooler such as a Peltier element in addition to or in place of the heater 3514. The heater 3514 is an example of a temperature regulator.

Like the modulator 351, the modulators 352 to 354 include ring resonators 3521 to 3541, driving circuits 3522 to 3542, detectors 3523 to 3543, and heaters 3524 to 3544, respectively. The modulators 352 to 354 each are the same as the modulator 351 and thus, description thereof is omitted.

The ring resonator 3511 is an annular waveguide. The ring resonator 3511 may be a circular or elliptic waveguide. The ring resonator 3511 resonates a light wave of a wavelength corresponding to the length of the waveguide. The wavelength corresponding to the length of the waveguide may be expressed as resonant wavelength.

The driving circuit 3512 amplifies the input transmission electric signals, and feeds the amplified transmission electric signals to the ring resonator 3511. In this embodiment, the transmission electric signals are voltage signals. In this embodiment, the amplification factor of the driving circuit 3512 is preset according to properties of the modulator 351.

The ring resonator 3511 has a pn junction. In this embodiment, feeding of the transmission electric signal is application of a voltage to the pn junction. By applying a voltage to the pn junction, a current flows through the pn junction. Since the current flowing through pn junction changes the refractive index, the intensity of the light wave of the resonant wavelength is modulated according to the transmission electric signal. The intensity of the light wave may be expressed as amplitude of the light wave.

The detector 3513 detects the intensity of light propagated from the ring resonator 3511. In this embodiment, the detector 3513 outputs a current corresponding to the intensity of the light propagated through the ring resonator 3511. The detector 3513 is a photodiode, for example. The photodiode may be formed of a compound semiconductor containing crystals of germanium (Ge) or indium gallium arsenide (InGaAs).

The detector 3513 to 3543 each are an example of a first detection section.

The temperature of the heater 3514 changes with the applied voltage. In this embodiment, the temperature of the heater 3514 becomes higher as the applied voltage is larger. With the change in the temperature of the heater 3514, the temperature of the ring resonator 3511 also changes. The ring resonator 3511 expands more as the temperature of the ring resonator 3511 is higher. Accordingly, the resonant wavelength of the ring resonator 3511 changes with the change in the temperature of the heater 3514.

Based on the light intensity detected by the detector 3513, the control section 360 controls the voltage applied to the heater 3514, such that the resonant wavelength of the ring resonator 3511 matches wavelength #1. Note that the control section 360 controls each of the modulators 352 to 354 as well in the same manner.

This can keep the state where the resonant wavelengths of the modulator 351 to 354 match N wavelengths #1 to #N of light waves output from the multiplexer 330, respectively.

In this manner, the N modulators 351 to 354 modulate the light waves of N wavelengths #1 to #N in the light waves propagated through the waveguide 340 according to the input N transmission electric signals. Each of the modulated light waves of N wavelengths #1 to #N may be expressed as optical signal. Note that N optical signals are multiplexed on an area of the waveguide 340 on the side of the optical transmission line 40 from the modulation section 350. The optical signals thus multiplexed may be expressed as multiplexed optical signal.

The control section 360 may feed a bias current to the pn junctions of the ring resonators 3511 to 3541 and adjust the amount of the bias current, thereby controlling the resonant wavelengths of the ring resonators 3511 to 3541.

In this embodiment, the multiplexer 330, the waveguide 340, and the modulator 351 to 354 each are an optical element made of a material containing silicon. In this embodiment, the transmitter 30 is implemented by silicon photonics.

Based on the light intensity detected by the detector 3513 to 3543, the control section 360 detects abnormality in each of the light waves of N wavelengths. In this embodiment, if the detected light intensity is smaller than a predetermined threshold, the control section 360 determines that the light wave is abnormal. In this embodiment, if the intensity of the detected light intensity is larger than the threshold, the control section 360 determines that the light wave is normal.

If abnormality in the light wave of wavelength #i is detected, the control section 360 outputs a switch instruction to instruct switching of the light source for wavelength #i to the optical switch 320. i represents an integer from 1 to N. In this embodiment, the switch instruction includes an identifier for identifying wavelength #i.

When receiving the switch instruction from the control section 360, the optical switch 320 switches the light wave of wavelength #i identified by the switch instruction, which is to be output to the multiplexer 330, from the light wave input from the first light source section 311 to the light wave input from the second light source section 312.

Next, the receiver 50 will be described.

Figure 3:
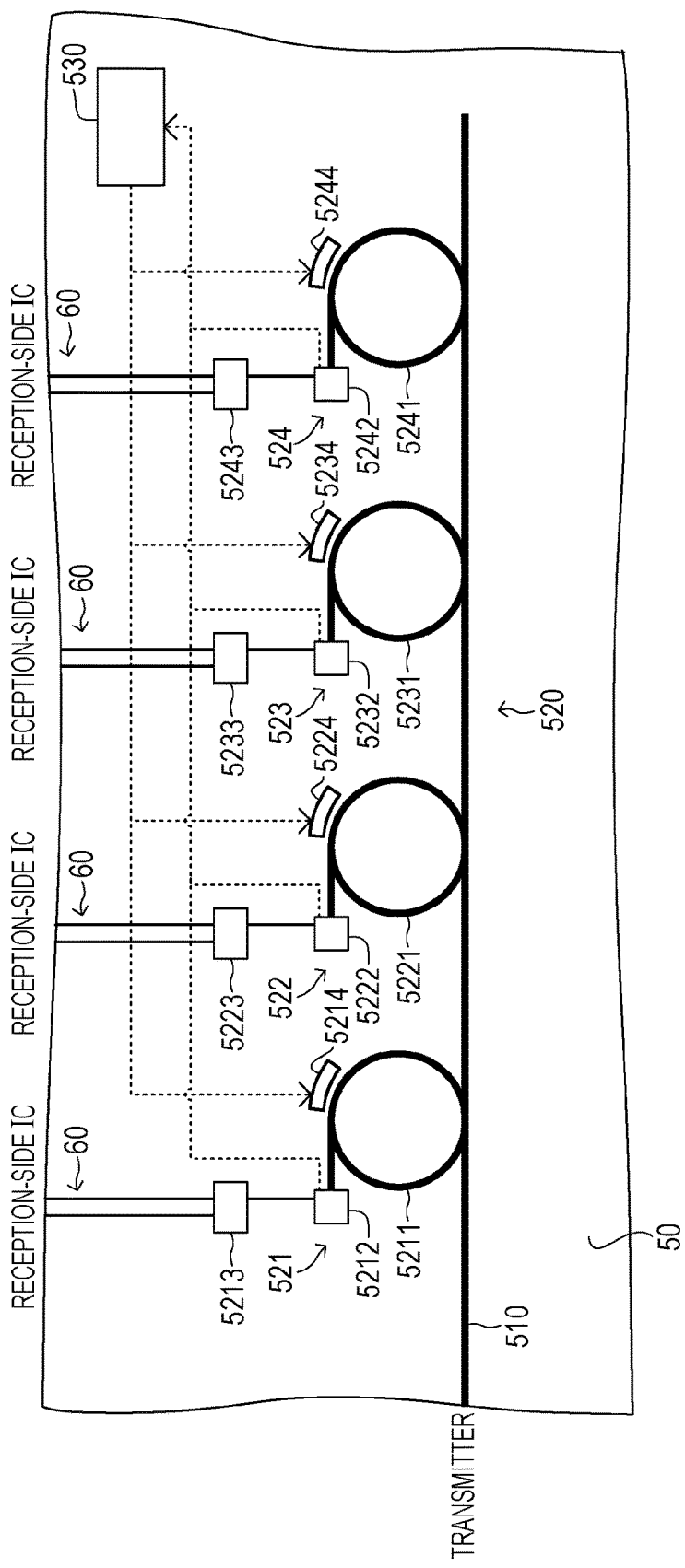
FIG. 3 is a block diagram illustrating a configuration example of a receiver in FIG. 1.

As illustrated in FIG. 3, the receiver 50 includes a waveguide 510, a demultiplexing section 520, and a control section 530.

The waveguide 510 propagate the multiplexed optical signal from the optical transmission line 40.

The demultiplexing section 520 includes N demultiplexers 521 to 524.

The N demultiplexers 521 to 524 are aligned along the waveguide 510. The N demultiplexers 521 to 524 separate optical signals of N wavelengths #1 to #N from the multiplexed optical signal propagated through the waveguide 510. The N demultiplexers 521 to 524 output reception electric signals corresponding to the separated optical signals of N wavelengths #1 to #N to the reception-side IC 70.

The demultiplexer 521 include a ring resonator 5211, a detector 5212, a converter 5213, and a heater 5214. The demultiplexer 521 may include a cooler such as a Peltier element in addition to the heater 5214 or in place of the heater 5214.

Like the demultiplexer 521, the demultiplexers 522 to 524 includes ring resonators 5221 to 5241, detectors 5222 to 5242, converters 5223 to 5243, and heaters 5224 to 5244, respectively. The demultiplexers 522 to 524 each are the same as the demultiplexer 521 and thus, description thereof is omitted.

The detector 5212 to 5242 each are an example of a first detection section.

The ring resonator 5211, the detector 5212, and the heater 5214 have the same configuration as the ring resonator 3511, the detector 3513, and the heater 3514, respectively.

The converter 5213 converts a current output from the detector 5212 into a voltage. The converter 5213 amplifies the converted voltage according to a predetermined amplification factor. The converter 5213 outputs the amplified voltage change as the reception electric signal to the reception-side IC 70. In this embodiment, the converter 5213 is a transimpedance amplifier (TIA).

Like the control section 360, based on the light intensity detected by the detector 5212, the control section 530 controls a voltage applied to the heater 5214 such that the resonant wavelength of the ring resonator 5211 matches wavelength #1. Note that the control section 530 controls each of the demultiplexers 522 to 524 as well in the same manner as the demultiplexer 521.

This can keep the state where the resonant wavelengths of the demultiplexers 521 to 524 match N wavelengths #1 to #N of light waves output from the multiplexer 330, respectively.

In this manner, the N demultiplexers 521 to 524 separate the optical signals of N wavelengths #1 to #N from the multiplexed optical signal propagated through the waveguide 510, and output the reception electric signals corresponding to the separated optical signals to the reception-side IC 70.

The control section 530 may feed a bias current to pn junctions of the ring resonators 5211 to 5241 and adjust the amount of the bias current, thereby controlling the resonant wavelengths of the ring resonators 5211 to 5241.

In this embodiment, the waveguide 510 and the demultiplexers 521 to 524 each are an optical element made of a material containing silicon. In this embodiment, the receiver 50 is implemented by silicon photonics.

(Operation)

Next, the operation of the optical transmission system 1 will be described with reference to FIG. 4.

In this embodiment, at activation of the optical transmission system 1, the optical switch 320 outputs each of the light waves of N wavelengths from the first light source section 311 to the multiplexer 330. Accordingly, at activation of the optical transmission system 1, the light sources included in the first light source section 311 may be referred to as current light sources. At activation of the optical transmission system 1, the light sources included in the second light source section 312 may be referred to as auxiliary light sources or redundant light sources.

The operation of the transmitter 30 will be first described.

Upon activation of the optical transmission system 1, the transmitter 30 modulates light waves of N wavelengths #1 to #4 from the first light source section 311, and transmits a multiplexed optical signal composed of the modulated optical signals.

Figure 4:
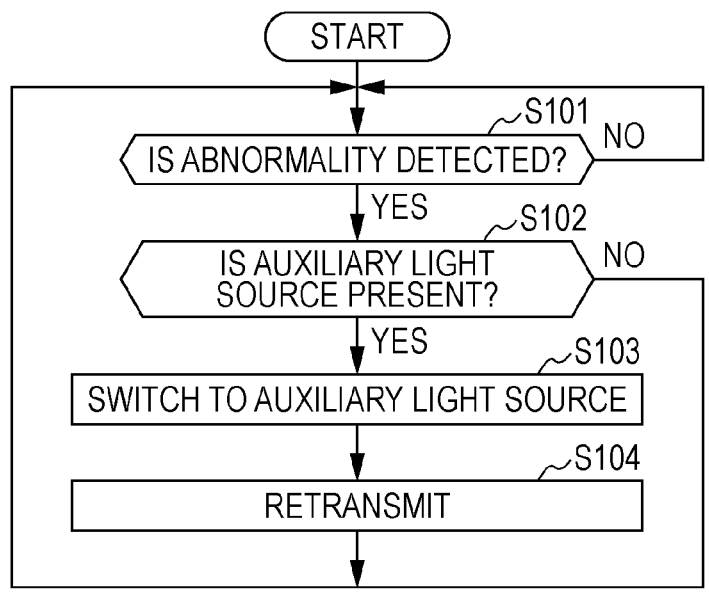
FIG. 4 is a flowchart illustrating an example of processing executed by the transmitter in FIG. 1.

Further, upon activation of the optical transmission system 1, the transmitter 30 executes processing illustrated in FIG. 4.

The control section 360 waits until detection of abnormality in at least one of light waves of N wavelengths ("No" in Step S101 in FIG. 4). Here, it is assumed that abnormality in the light wave of wavelength #1 is detected.

In this case, the control section 360 selects "Yes", and determines whether or not the auxiliary light source for the light wave of wavelength #i having abnormality is present (Step S102 in FIG. 4).

In this embodiment, the control section 360 holds information on the number of the auxiliary light sources for each of N wavelengths. In this embodiment, at activation of the optical transmission system 1, the control section 360 holds "1" as the information on the number of the auxiliary light sources for each of N wavelengths. In this embodiment, as described below, when switching the light source for wavelength #i, the control section 360 subtracts "1" from the number of the auxiliary light sources, which is indicated by the information for wavelength #i.

Consequently, at this time, the control section 360 holds "1" as the information on the number of the auxiliary light sources for the light wave of wavelength #i having abnormality. Thus, the control section 360 selects "Yes", and outputs a switch instruction to switch the light source for wavelength #i to the optical switch 320. In response to this, the optical switch 320 switches the light wave of wavelength #i identified by the switch instruction, which is to be output to the multiplexer 330, from the light wave from the first light source section 311 to the light wave from the second light source section 312 (Step S103 in FIG. 4).

Then, the transmitter 30 retransmits the optical signal that was not normally received by the receiver 50 due to abnormality in the light wave of wavelength #i (Step S104 in FIG. 4). The transmitter 30 may transmit an optical signal corresponding to data of predetermined size, an optical signal transmitted at a predetermined time, or an optical signal corresponding to a unit of transaction processing.

Then, the transmitter 30 returns to Step S101, and repeats the processing in Step S101 to Step S104.

If the auxiliary light source for the light wave of wavelength #i having abnormality is not present, the control section 360 selects "No" in Step S102, and returns to Step S101.

Next, the operation of the receiver 50 will be described.

Upon activation of the optical transmission system 1, the receiver 50 receives a multiplexed optical signal composed of the optical signals of N wavelengths #1 to #4. The receiver 50 separates the optical signals of N wavelengths #1 to #4 from the received multiplexed optical signal, and outputs reception electric signals corresponding to the separated optical signals to the reception-side IC 70.

As described above, when abnormality is detected in the light wave from the first light source, the optical transmission system 1 according to the first embodiment transmits the multiplexed optical signal including the optical signals of modulated light waves from the second light source in place of the optical signals of modulated light waves from the first light source. In this embodiment, the first light source is included in the first light source section 311, and the second light source is included in the second light source section 312.

Thus, when abnormality is detected in the light wave from the first light source, the multiplexed optical signal including the optical signals of the modulated light waves from the second light source is transmitted. As a result, when abnormality is detected in the light wave from the first light source, the multiplexed optical signal can restrain a decrease in the transmission rate that is the amount of information transmitted per unit time.

The optical transmission system 1 according to the first embodiment includes the optical switch 320 that switches the light wave to be output to the modulation section 350 from the light wave from the first light source to the light wave from the second light source when abnormality is detected in the light wave from the first light source.

Such switching of the light wave can be performed more rapidly than switching of the path of the electric signal. As a result, when abnormality occurs in the light wave from the first light source, a decrease in the transmission rate can be restrained.

In addition, when abnormality is detected in any one of a plurality of wavelengths, the optical transmission system 1 according to the first embodiment switches the light wave to be output to the modulation section 350, from the light wave from the first light source section 311 to the light wave from the second light source section 312.

Such switching of the light wave can be performed more rapidly than switching of the path of the electric signal. As a result, when abnormality occurs in the light wave from the first light source 311, a decrease in the transmission rate can be restrained. Even when abnormality occurs in any of the plurality of wavelengths, a decrease in the transmission rate can be restrained.

Note that the optical transmission system 1 includes only one auxiliary light source for each wavelength, but may include a plurality of auxiliary light sources for each wavelength. The optical transmission system 1 includes the auxiliary light source for each of N wavelengths, but does not have to include the auxiliary light sources for some of N wavelengths.

Second Embodiment

Next, an optical transmission system according to a second embodiment will be described. The optical transmission system according to the second embodiment is different from the optical transmission system according to the first embodiment in an auxiliary modulator that modulates the light wave of auxiliary wavelength when abnormality is detected. The difference will be mainly described below. The same or substantially similar components in the second embodiment are given the same reference numerals as those in the first embodiment.

(Configuration)

Figure 5:
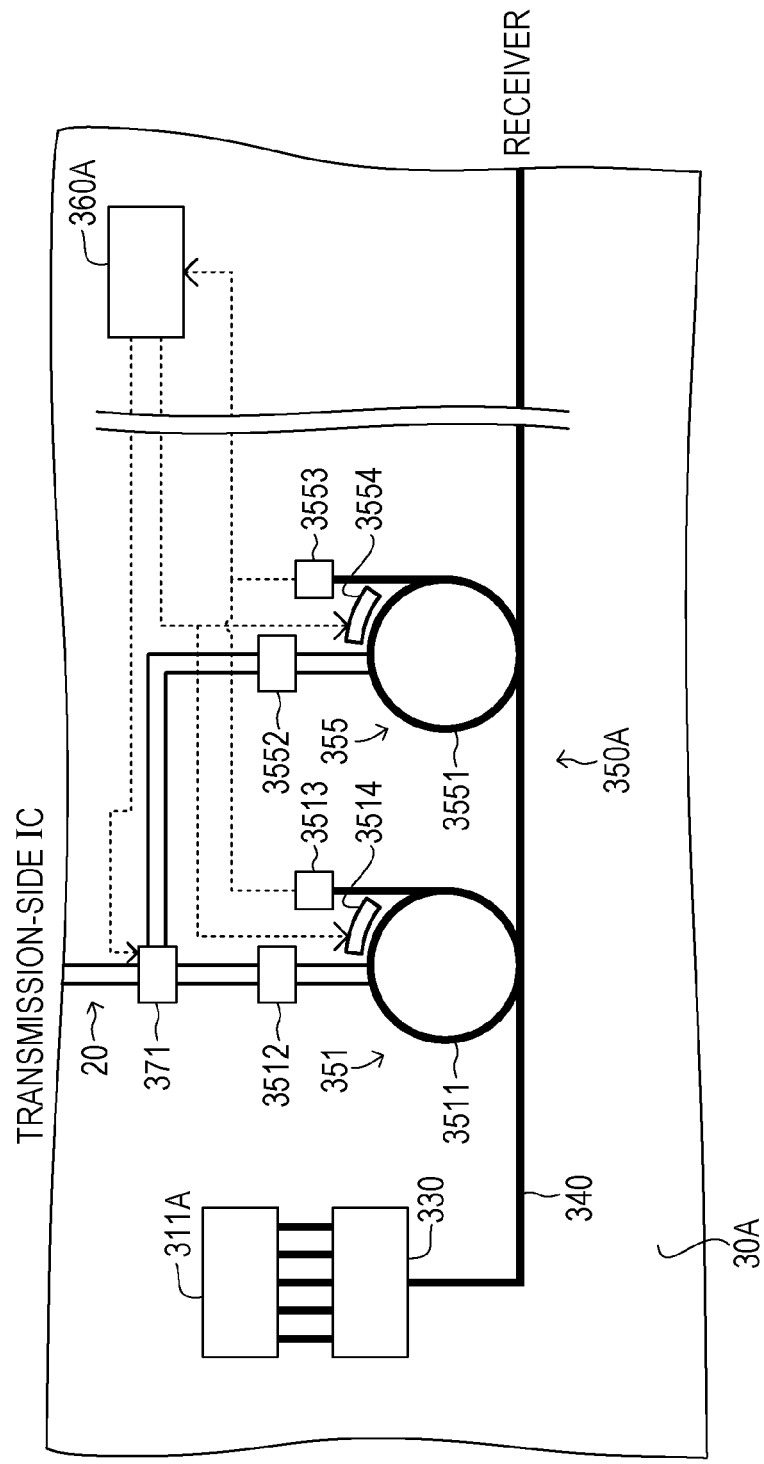
FIG. 5 is a block diagram illustrating a configuration example of a transmitter according to a second embodiment.

As illustrated in FIG. 5, a transmitter 30A in the second embodiment includes a first light source section 311A, a modulation section 350A, and a control section 360A in place of a first light source section 311, a modulation section 350, and a control section 360 in FIG. 2.

The first light source section 311A outputs light waves of N+1 (in this embodiment, 5) different wavelengths #1 to #5 to the multiplexer 330.

The multiplexer 330 combines the light waves of N+1 wavelength #1 to #5 from the first light source section 311A, and outputs the combined light wave to the waveguide 340.

The waveguide 340 propagates the light wave from the multiplexer 330 to the optical transmission line 40. The light from the multiplexer 330 is a multiplexed light wave composed of the unmodulated light waves of N+1 wavelength #1 to #5.

The modulation section 350A includes a modulator 355 and a switch 371 in addition to the modulation section 350 in FIG. 2. Like the modulator 351, the modulator 355 includes a ring resonator 3551, a driving circuit 3552, a detector 3553, and a heater 3554.

The modulator 355 has the same function as the modulator 351 except for the resonant wavelength. The modulator 351 is an example of a first modulator. The modulator 355 is an example of a second modulator.

Based on the light intensity detected by the detector 3553, the control section 360A controls a voltage applied to the heater 3554 such that the resonant wavelength of the ring resonator 3551 matches wavelength #5.

Transmission electric signals are input from the transmission-side IC 10 to the switch 371 via the wires 20. The switch 371 outputs the input transmission electric signals to either of the modulator 351 or the modulator 355. In other words, the switch 371 switches the destination for the input transmission electric signals between the modulator 351 and the modulator 355.

In this embodiment, at activation of the optical transmission system 1, the switch 371 outputs the input transmission electric signals to the modulator 351. The switch 371 is an example of a second switch.

Thus, at activation of the optical transmission system 1, the modulator 351 may be referred to as current modulator. Further, at activation of the optical transmission system 1, the modulator 355 may be referred to as an auxiliary modulator or a redundant modulator. At activation of the optical transmission system 1, wavelengths #1 to #4 may be referred to as current wavelengths. At activation of the optical transmission system 1, wavelength #5 may be referred to as auxiliary wavelength.

Thus, at activation of the optical transmission system 1, the transmitter 30A transmits the multiplexed optical signal composed of the optical signals of N wavelengths #1 to #4 and the unmodulated light wave of wavelength #5. Wavelength #1 is an example of a first wavelength. Wavelength #5 is an example of a second wavelength.

Based on the light intensity detected by the detector 3513, the control section 360A detects abnormality in the light wave of the wavelength #1. In this embodiment, if the detected light intensity is smaller than a predetermined threshold, the control section 360A detects that the light wave of the wavelength #1 is abnormal. In this embodiment, if the detected light intensity is larger than the threshold, the control section 360A determines that the light wave is normal.

If abnormality is detected in the light wave of the wavelength #1, the control section 360A outputs a switch instruction to switch wavelength to the switch 371.

When receiving the switch instruction from the control section 360A, the switch 371 switches the destination for the input transmission electric signals from the modulator 351 to the modulator 355. Thereby, the transmitter 30A transmits a multiplexed optical signal composed of the optical signals of N wavelengths #2 to #5 and the unmodulated light wave of wavelength #1.

Figure 6:
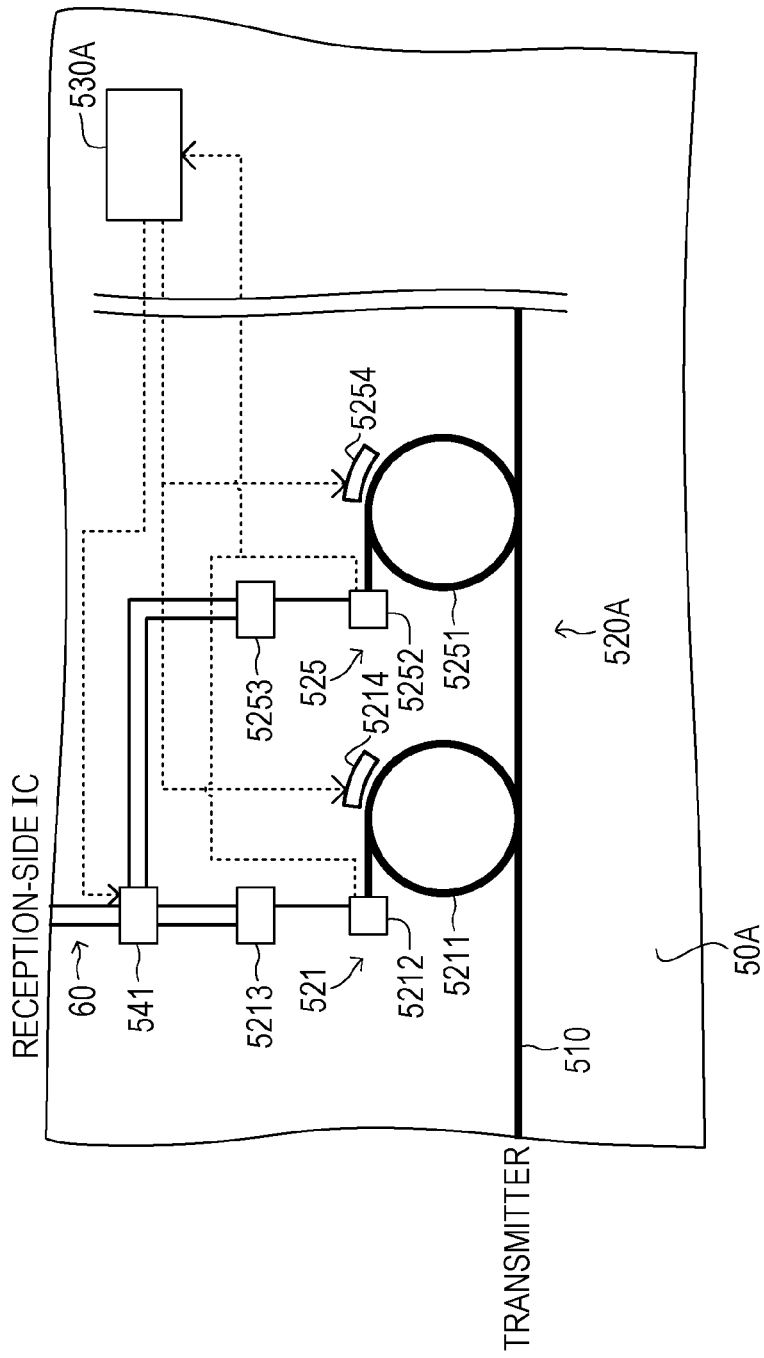
FIG. 6 is a block diagram illustrating a configuration example of a receiver according to the second embodiment.

As illustrated in FIG. 6, a receiver 50A in the second embodiment includes a demultiplexing section 520A and a control section 530A in place of the demultiplexing section 520 and the control section 530 in FIG. 3.

The demultiplexing section 520A includes a demultiplexer 525 in place of the demultiplexing section 520 in FIG. 3, and a switch 541. Like the demultiplexer 521, the demultiplexer 525 includes a ring resonator 5251, a detector 5252, a converter 5253, and a heater 5254.

The demultiplexer 525 has the same function as the demultiplexer 521 except that the resonant wavelength is different from that of the demultiplexer 521. The demultiplexer 521 is an example of a first demultiplexer. The demultiplexer 525 is an example of a second demultiplexer.

Based on the light intensity detected by the detector 5252, the control section 530A controls a voltage applied to the heater 5254 such that the resonant wavelength of the ring resonator 5251 matches wavelength #5.

The switch 541 receives reception electric signals from either the demultiplexer 521 of the demultiplexer 525. In other words, the switch 541 switches the source for the reception electric signal between the demultiplexer 521 and the demultiplexer 525.

The switch 541 outputs the input reception electric signals to the reception-side IC 70 via the wires 60. In other words, the switch 541 switches electric signals output as the reception electric signals between electric signals corresponding to the optical signals separated by the demultiplexer 521 and electric signals corresponding to the optical signals separated by the demultiplexer 525.

In this embodiment, at activation of the optical transmission system 1, the switch 541 outputs the reception electric signals input from the demultiplexer 521 to the reception-side IC 70. The switch 541 is an example of a third switch.

Thus, at activation of the optical transmission system 1, the demultiplexer 521 may be referred to as a current demultiplexer. Further, at activation of the optical transmission system 1, the demultiplexer 525 may be referred to as auxiliary demultiplexer or redundant demultiplexer.

Thus, at activation of the optical transmission system 1, the receiver 50A separates optical signals of N wavelengths #1 to #4 from a received multiplexed optical signal, and outputs reception electric signals corresponding to the separated optical signals to the reception-side IC 70.

Based on the light intensity detected by the detector 5212, the control section 530A detects abnormality in the light wave of the wavelength #1. In this embodiment, if the detected light intensity is smaller than a predetermined threshold, the control section 530A detects that the light wave of the wavelength #1 is abnormal. In this embodiment, if the detected light intensity is larger than the threshold, the control section 530A detects that the light wave of the wavelength #1 is normal.

Upon detection of abnormality in the light wave of the wavelength #1, the control section 530A outputs a switch instruction to switch wavelength to the switch 541.

When receiving the switch instruction from the control section 530A, the switch 541 switches a source for the reception electric signals from the demultiplexer 521 to the demultiplexer 525. Thereby, the receiver 50A separates optical signals of N wavelengths #2 to #5 from the received multiplexed optical signal, and outputs the reception electric signals corresponding to the separated optical signals to the reception-side IC 70.

(Operation)

Next, the operation of the optical transmission system 1 according to the second embodiment will be described with reference to FIG. 7 and FIG. 8.

In this embodiment, at activation of the optical transmission system 1, the switch 371 outputs the input transmission electric signals to the modulator 351. In this embodiment, at activation of the optical transmission system 1, the switch 541 outputs the reception electric signals input from the demultiplexer 521 to the reception-side IC 70.

The operation of the transmitter 30A will be first described.

Upon activation of the optical transmission system 1, the transmitter 30A transmits a multiplexed optical signal composed of the optical signals of N wavelengths #1 to #4 and the unmodulated light wave of wavelength #5.

Figure 7:
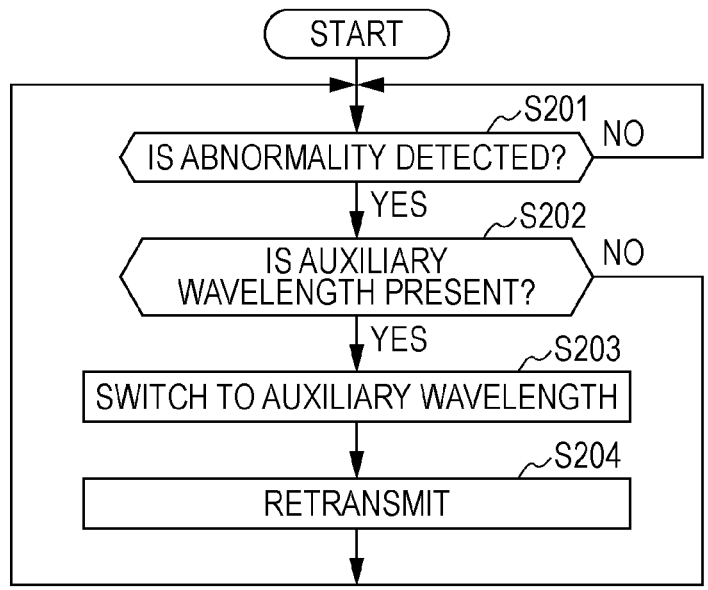
FIG. 7 is a flowchart illustrating an example of processing executed by the transmitter in FIG. 5.

Upon activation of the optical transmission system 1, the transmitter 30A executes processing illustrated in FIG. 7.

The control section 360A waits until detection of abnormality in the light wave of the wavelength #1 ("No" in Step S201 in FIG. 7). Here, it is assumed that abnormality is detected in the light wave of the wavelength #1.

In this case, control section 360A selects "Yes", and determines whether or not the auxiliary wavelength is present (Step S202 in FIG. 7).

In this embodiment, the control section 360A holds information on the number of the auxiliary wavelengths. In this embodiment, at activation of the optical transmission system 1, the control section 360A holds "1" as the number of the auxiliary wavelengths. In this embodiment, when switching wavelength as described later, the control section 360A subtracts "1" from the number of the auxiliary wavelengths, which is indicated by the held information.

Consequently, at this time, the control section 360A holds "1" as the information on the number of the auxiliary wavelengths. Thus, the control section 360A selects "Yes", and outputs a switch instruction to switch wavelength to the switch 371.

Thereby, the switch 371 switches the destination for the input transmission electric signals from the modulator 351 to the modulator 355 (Step S203 in FIG. 7). Accordingly, the transmitter 30A modulates the light wave of wavelength #5 in place of the light wave of the wavelength #1. Thus, the transmitter 30A transmits a multiplexed optical signal composed of the optical signals of N wavelengths #2 to #5 and the unmodulated light wave of wavelength #1.

Then, the transmitter 30A retransmits the optical signal that was not received by the receiver 50A due to abnormality in the light wave of the wavelength #1 (Step S204 in FIG. 7). The transmitter 30A may transmit an optical signal corresponding to data of predetermined size, an optical signal transmitted at a predetermined time, or an optical signal corresponding to a unit of transaction processing.

Then, the transmitter 30A returns to Step S201, and repeats the processing in Step S201 to Step S204.

If the auxiliary wavelength is not present, the control section 360A selects "No" in Step S202, and returns to Step S201.

Next, the operation of the receiver 50A will be described.

Upon activation of the optical transmission system 1, the receiver 50A receives a multiplexed optical signal composed of the optical signals of N wavelengths #1 to #4 and the unmodulated light wave of wavelength #5. The receiver 50A separates the optical signals of N wavelengths #1 to #4 from the received multiplexed optical signal, and outputs reception electric signals corresponding to the separated optical signals to the reception-side IC 70.

Figure 8:
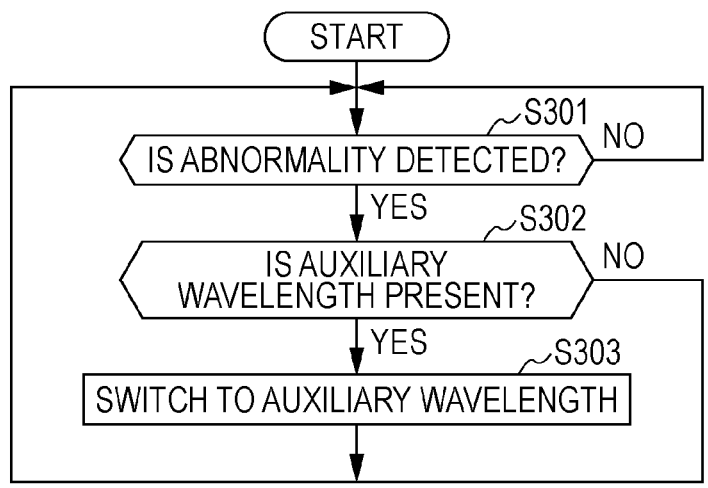
FIG. 8 is a flowchart illustrating an example of processing executed by the receiver in FIG. 6.

Further, upon activation of the optical transmission system 1, the receiver 50A executes processing illustrated in FIG. 8.

The control section 530A waits until detection of abnormality in the light wave of the wavelength #1 ("No" in Step S301 in FIG. 8). Here, it is assumed that abnormality is detected in the light wave of the wavelength #1.

In this case, the control section 530A selects "Yes", and determines whether or not the auxiliary wavelength is present (Step S302 in FIG. 8).

In this embodiment, like the control section 360A, the control section 530A holds information on the number of the auxiliary wavelengths.

Consequently, at this time, the control section 530A holds "1" as the information on the number of the auxiliary wavelengths. Thus, the control section 530A selects "Yes", and outputs a switch instruction to switch wavelength to the switch 541.

Thereby, the switch 541 switches the source for the reception electric signals from the demultiplexer 521 to the demultiplexer 525 (Step S303 in FIG. 8). As a result, the receiver 50A separates optical signals of N wavelengths #2 to #5 from the received multiplexed optical signal, and outputs the reception electric signals corresponding to the separated optical signals to the reception-side IC 70.

Then, the receiver 50A returns to Step S301, and repeats the processing in Step S301 to Step S303.

If the auxiliary wavelength is not present, the control section 530A selects "No" in Step S302, and returns to Step S301.

As described above, when abnormality is detected in the light wave from the first light source, the optical transmission system 1 according to the second embodiment transmits the multiplexed optical signal including optical signals of modulated light waves from the second light source in place of optical signals of modulated light waves from the first light source. In this embodiment, the first light source is a part of the first light source section 311A, which that outputs the light wave of the wavelength #1, and the second light source is a part of the first light source section 311A, which that outputs the light wave of wavelength #5.

Thus, when abnormality is detected in the light wave from the first light source, the multiplexed optical signal including the optical signals of modulated light waves from the second light source. For this reason, when abnormality is detected in the light wave from the first light source, the multiplexed optical signal can restrain a decrease in the transmission rate that is the amount of information transmitted per unit time.

Further, when abnormality is detected in the light wave of the wavelength #1, the demultiplexing section 520A in the second embodiment switches the electric signals output as the reception electric signals, from the electric signals corresponding to the separated optical signals for wavelength #1 to electric signals corresponding to the separated optical signals for wavelength #5.

That is, when abnormality is detected in the light wave of the wavelength #1, the electric signals corresponding to the separated optical signals for wavelength #5 are output as the reception electric signals. This can restrain a decrease in the transmission rate at occurrence of abnormality in the light wave of the wavelength #1.

The optical transmission system 1 according to the second embodiment includes only one auxiliary wavelength, and may include a plurality of auxiliary wavelengths. The optical transmission system 1 includes the auxiliary modulator and the auxiliary demultiplexer for one wavelength #1, but may include the auxiliary modulator and the auxiliary demultiplexer for each of N wavelengths #1 to #4. The optical transmission system 1 may include the auxiliary modulator and the auxiliary demultiplexer for some of N wavelengths #1 to #4.

Third Embodiment

Next, an optical transmission system according to a third embodiment of the present disclosure will be described. The optical transmission system 1 according to the third embodiment is different from the optical transmission system according to the first embodiment in that the temperature of the modulator in that the light wave of the auxiliary wavelength is modulated when abnormality is detected. The difference will be mainly described. The same or substantially similar components in the third embodiment are given the same reference numerals as those in the first embodiment.

(Configuration)

Figure 9:
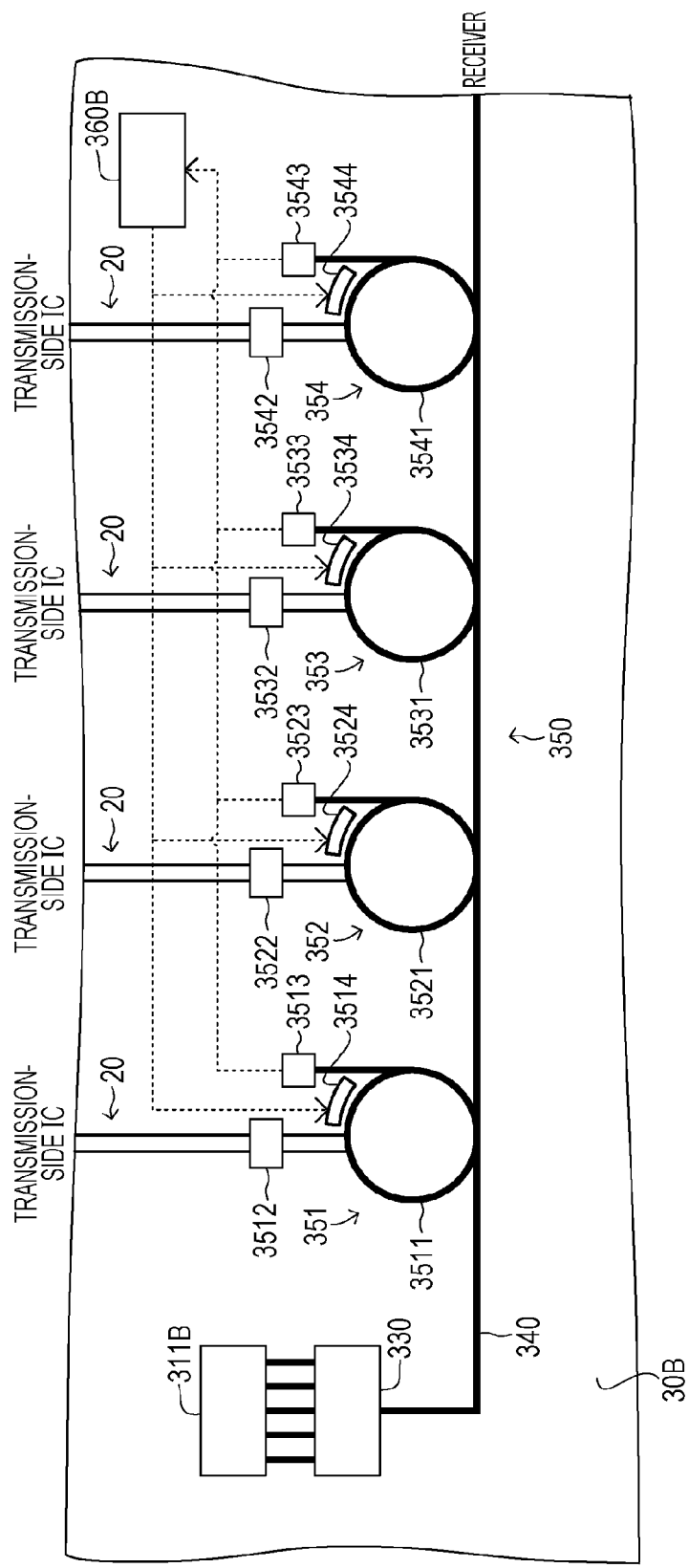
FIG. 9 is a block diagram illustrating a configuration example of a transmitter according to a third embodiment.

As illustrated in FIG. 9, a transmitter 30B in the third embodiment includes a first light source section 311B and a control section 360B in place of the first light source section 311 and the control section 360 in FIG. 2. The control section 360B is an example of a first control section.

The first light source section 311B outputs light waves of N+1 (in this embodiment, 5) different wavelengths #1 to #5 to the multiplexer 330.

The multiplexer 330 combines the light waves of N+1 wavelength #1 to #5 from the first light source section 311B, and outputs the combined light wave to the waveguide 340.

The waveguide 340 propagates the light wave from the multiplexer 330 to the optical transmission line 40. The light wave from the multiplexer 330 is a multiplexed light wave composed of unmodulated light waves of N+1 wavelengths #1 to #5.

In this embodiment, at activation of the optical transmission system 1, the control section 360B controls a voltage applied to the heater 3514 to 3544 such that the resonant wavelengths of the N modulators 351 to 354 match N wavelengths #1 to #4, respectively. Accordingly, at activation of the optical transmission system 1, the N modulators 351 to 354 modulate light waves of N wavelengths #1 to #4 propagated by the waveguide 340 according to the input N transmission electric signals. In this embodiment, at activation of the optical transmission system 1, wavelengths #1 to #4 may be referred to as current wavelengths. Further, at activation of the optical transmission system 1, wavelength #5 may be referred to as auxiliary wavelength.

Thus, at activation of the optical transmission system 1, the transmitter 30B transmits a multiplexed optical signal composed of the optical signals of N wavelengths #1 to #4 and the unmodulated light wave of wavelength #5. Wavelengths #1 to #4 are an example of a first wavelength. Wavelength #5 is an example of a second wavelength.

Based on the light intensity detected by the detectors 3513 to 3543, the control section 360B detects abnormality in each of light waves of N wavelengths #1 to #4. In this embodiment, if the detected light intensity is smaller than predetermined threshold, the control section 360B determines that the light wave is abnormal. In this embodiment, if the detected light intensity is larger than the threshold, the control section 360B determines that the light wave is normal.

When abnormality is detected in the light wave of wavelength #1, the control section 360B controls the temperature of the ring resonator 3511 to 3541 having the resonant wavelength of wavelength #i such that the resonant wavelength matches wavelength #5. i represents an integer of 1 to N. Thus, the modulator 351 to 354 that have modulated the light wave of wavelength #i before detection of abnormality in the light wave of wavelength #i becomes to modulate the light wave of wavelength #5.

As a result, when abnormality is detected in the light wave of wavelength #1, the transmitter 30B transmits a multiplexed optical signal composed of the optical signals of N wavelengths #2 to #5 and the unmodulated light wave of wavelength #1.

Figure 10:
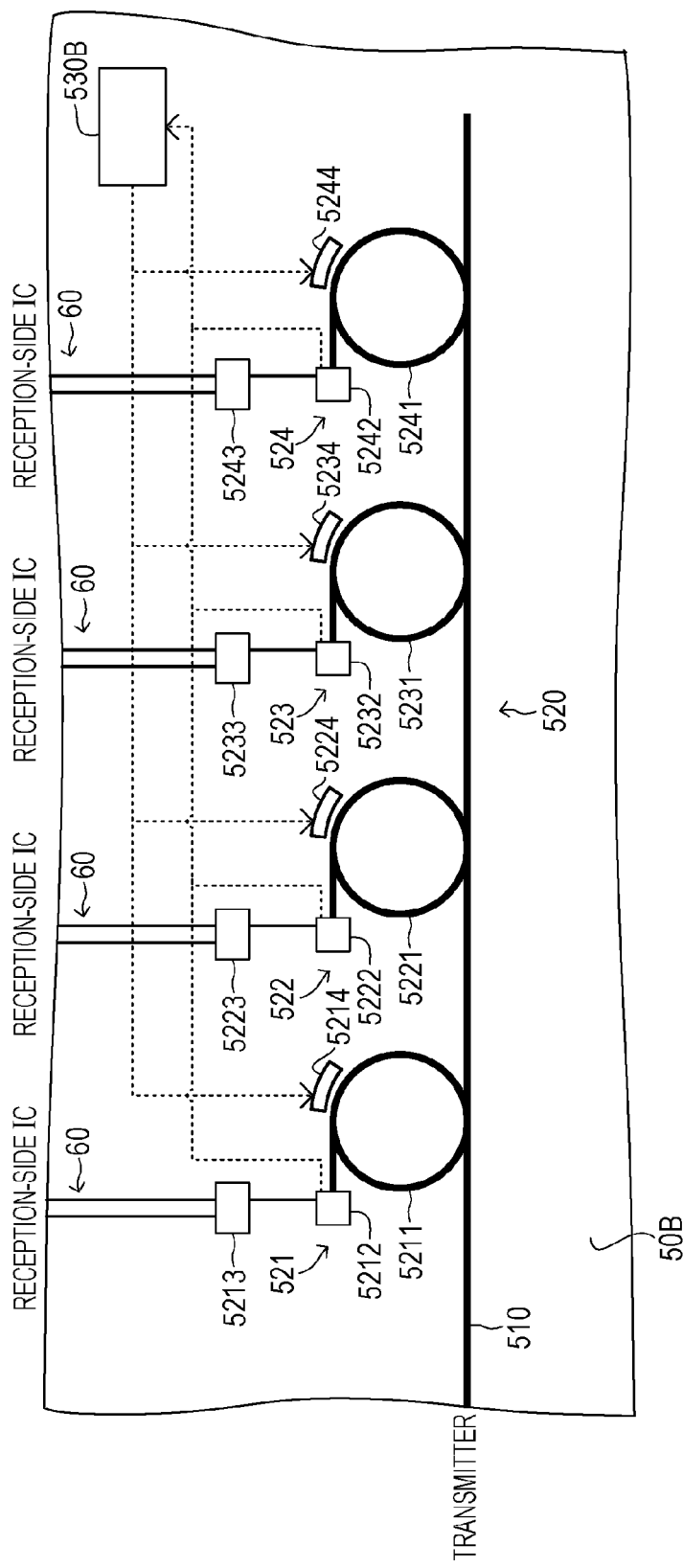
FIG. 10 is a block diagram illustrating a configuration example of a receiver according to the third embodiment.

As illustrated in FIG. 10, a receiver 50B in the third embodiment includes a control section 530B in place of the control section 530 in FIG. 3. The control section 530B is an example of a second control section.

In this embodiment, at activation of the optical transmission system 1, the control section 530B controls a voltage applied to the heaters 5214 to 5244 such that resonant wavelengths of the N demultiplexers 521 to 524 match N wavelengths #1 to #4, respectively. Accordingly, at activation of the optical transmission system 1, the N demultiplexers 521 to 524 separate the optical signals of N wavelengths #1 to #4 from the received multiplexed optical signal, and outputs the reception electric signals corresponding to the separated optical signals to the reception-side IC 70.

Based on the light intensity detected by the detector 5212 to 5242, the control section 530B detects abnormality in each of light waves of N wavelengths #1 to #4. In this embodiment, if the detected light intensity is smaller than a predetermined threshold, the control section 530B determines that the light wave is abnormal. In this embodiment, if the detected light intensity is larger than the threshold, the control section 530B determines that the light wave is normal.

When abnormality is detected in the light wave of wavelength #1, the control section 530B controls the temperature of the ring resonators 5211 to 5241 having the resonant wavelength of wavelength #i such that the resonant wavelength matches wavelength #5. i represents an integer from 1 to N. Thus, the demultiplexers 521 to 524 that have separated the optical signal of wavelength #i before detection of abnormality in the light wave of wavelength #i becomes to separate the optical signal of wavelength #5.

As a result, for example, when abnormality is detected in the light wave of wavelength #1, the receiver 50B separates optical signals of N wavelengths #2 to #5 from the received multiplexed optical signal, and outputs the reception electric signals corresponding to the separated optical signals to the reception-side IC 70.

(Operation)

Next, the operation of the optical transmission system 1 according to the third embodiment will be described with reference to FIG. 7 and FIG. 8.

In this embodiment, optical transmission system 1, the control section 360B controls the voltage applied to the heaters 3514 to 3544 such that the resonant wavelengths of the N modulators 351 to 354 match N wavelengths #1 to #4, respectively. In this embodiment, at activation of the optical transmission system 1, the control section 530B controls the voltage applied to the heaters 5214 to 5244 such that the resonant wavelengths of the N demultiplexers 521 to 524 match N wavelengths #1 to #4, respectively.

The operation of the transmitter 30B will be first described.

Upon activation of the optical transmission system 1, the transmitter 30B transmits a multiplexed optical signal composed of the optical signals of N wavelengths #1 to #4 and the unmodulated light wave of wavelength #5.

Further, upon activation of the optical transmission system 1, the transmitter 30B executes processing illustrated in FIG. 7.

The control section 360B waits until detection of abnormality in at least one of the light waves of N wavelengths ("No" in Step S201 in FIG. 7). Here, it is assumed that abnormality in the light wave of wavelength #1 is detected.

In this case, control section 360B selects "Yes", whether or not the auxiliary wavelength is present (Step S202 in FIG. 7).

In this embodiment, the control section 360B holds information on the number of the auxiliary wavelengths. In this embodiment, at activation of the optical transmission system 1, the control section 360B holds "1" as the information on the number of the auxiliary wavelengths. In this embodiment, when switching wavelength as described later, the control section 360B subtracts "1" from the number of the auxiliary wavelengths, which is indicated by the held information.

Consequently, at this time, the control section 360B holds "1" as the information on the number of the auxiliary wavelengths. Thus, the control section 360B selects "Yes", and controls the temperature of the ring resonator 3511 having the resonant wavelength of wavelength #1 such that the resonant wavelength matches wavelength #5 (Step S203 in FIG. 7). Thereby, the transmitter 30B modulates the light wave of wavelength #5 in place of the light wave of the wavelength #1. As a result, the transmitter 30B transmits a multiplexed optical signal composed of the optical signals of N wavelengths #2 to #5 and the unmodulated light wave of wavelength #1.

Then, the transmitter 30B retransmits the optical signal that was not received by the receiver 50B due to abnormality in the light wave of the wavelength #1 (Step S204 in FIG. 7). The transmitter 30B may transmit an optical signal corresponding to data of predetermined size, an optical signal transmitted at a predetermined time, or an optical signal corresponding to a unit of transaction processing.

Then, the transmitter 30B returns to Step S201, and repeats the processing in Step S201 to Step S204.

If the auxiliary wavelength is not present, the control section 360B selects "No" in Step S202, and returns to Step S201.

Next, the operation of the receiver 50B will be described.

Upon activation of the optical transmission system 1, the receiver 50B receives a multiplexed optical signal composed of the optical signals of N wavelengths #1 to #4 and the unmodulated light wave of wavelength #5. The receiver 50B separates the optical signals of N wavelengths #1 to #4 from the received multiplexed optical signal, and outputs the reception electric signals corresponding to the separated optical signals to the reception-side IC 70.

Further, upon activation of the optical transmission system 1, the receiver 50B execute processing illustrated in FIG. 8.

The control section 530B waits until detection of abnormality in at least one of the light waves of N wavelengths ("No" in Step S301 in FIG. 8). According to the above-mentioned assumption, abnormality in the light wave of the wavelength #1 is detected.

Thus, the control section 530B selects "Yes", and determines whether or not the auxiliary wavelength is present (Step S302 in FIG. 8).

In this embodiment, like the control section 360B, the control section 530B holds information on the number of the auxiliary wavelengths.

Consequently, at this time, the control section 530B holds "1" as the information on the number of the auxiliary wavelengths. Thus, the control section 530B selects "Yes", and controls the temperature of the ring resonator 5211 having the resonant wavelength of wavelength #1 such that the resonant wavelength matches wavelength #5 (Step S303 in FIG. 8). Thereby, the receiver 50B separates the optical signal of wavelength #5 from the received multiplexed optical signal in place of the optical signal of wavelength #1.

As a result, the receiver 50B separates the optical signals of N wavelengths #2 to #5 from the received multiplexed optical signal, and outputs the reception electric signals corresponding to the separated optical signals to the reception-side IC 70.

Then, the receiver 50B returns to Step S301, and repeats the processing in Step S301 to Step S303.

If the auxiliary wavelength is not present, the control section 530B selects "No" in Step S302, and returns to Step S301.

As described above, when abnormality is detected in the light wave from the first light source, the optical transmission system 1 according to the third embodiment transmits the multiplexed optical signal including the optical signal of the modulated light wave from the second light source in place of the optical signal of the modulated light wave from the first light source. In this embodiment, the first light source is a part of the first light source section 311B, which outputs the light wave of the wavelength #1, and the second light source is a part of the first light source section 311B, which outputs the light wave of wavelength #5.

Thus, when abnormality is detected in the light wave from the first light source, the multiplexed optical signal including the optical signal of the modulated light wave from the second light source is transmitted. For this reason, at occurrence of abnormality in the light wave from the first light source, the multiplexed optical signal can restrain a decrease in the transmission rate that is the amount of information transmitted per unit time.

Further, when abnormality is detected in the light wave of the wavelength #1, the control section 360B in the third embodiment controls the temperature of the ring resonator 3511 such that the resonant wavelength of the ring resonator 3511 matches wavelength #5.

Thus, when abnormality is detected in the light wave of the wavelength #1, the wavelength of the modulated light wave can be rapidly switched from wavelength #1 to the wavelength #5 without switching the signal path. This can restrain a decrease in the transmission rate at occurrence of abnormality in the light wave of the wavelength #1.

In addition, when abnormality is detected in the light wave of the wavelength #1, the control section 530B in the third embodiment controls the temperature of the ring resonator 5211 such that the resonant wavelength of the ring resonator 5211 matches wavelength #5.

Thus, when abnormality is detected in the light wave of the wavelength #1, the wavelength of the separated optical signal can be rapidly switched from wavelength #1 to wavelength #5 without switching the signal path. This can restrain a decrease in the transmission rate at occurrence of abnormality in the light wave of the wavelength #1.

The optical transmission system 1 according to the third embodiment include only one auxiliary wavelength, but may be include a plurality of auxiliary wavelengths.

First Modification Example of Third Embodiment

Next, an optical transmission system in a first modification example of the third embodiment of the present disclosure will be described. The optical transmission system in the first modification example of the third embodiment is different from the optical transmission system 1 according to the third embodiment in that a receiver detects temperature, and the voltage applied to the heater is determined based on the detected temperature. The difference will be mainly described below. The same or substantially similar components in the first modification example of the third embodiment are given the same reference numerals as those in the third embodiment.

(Configuration)

Figure 11:
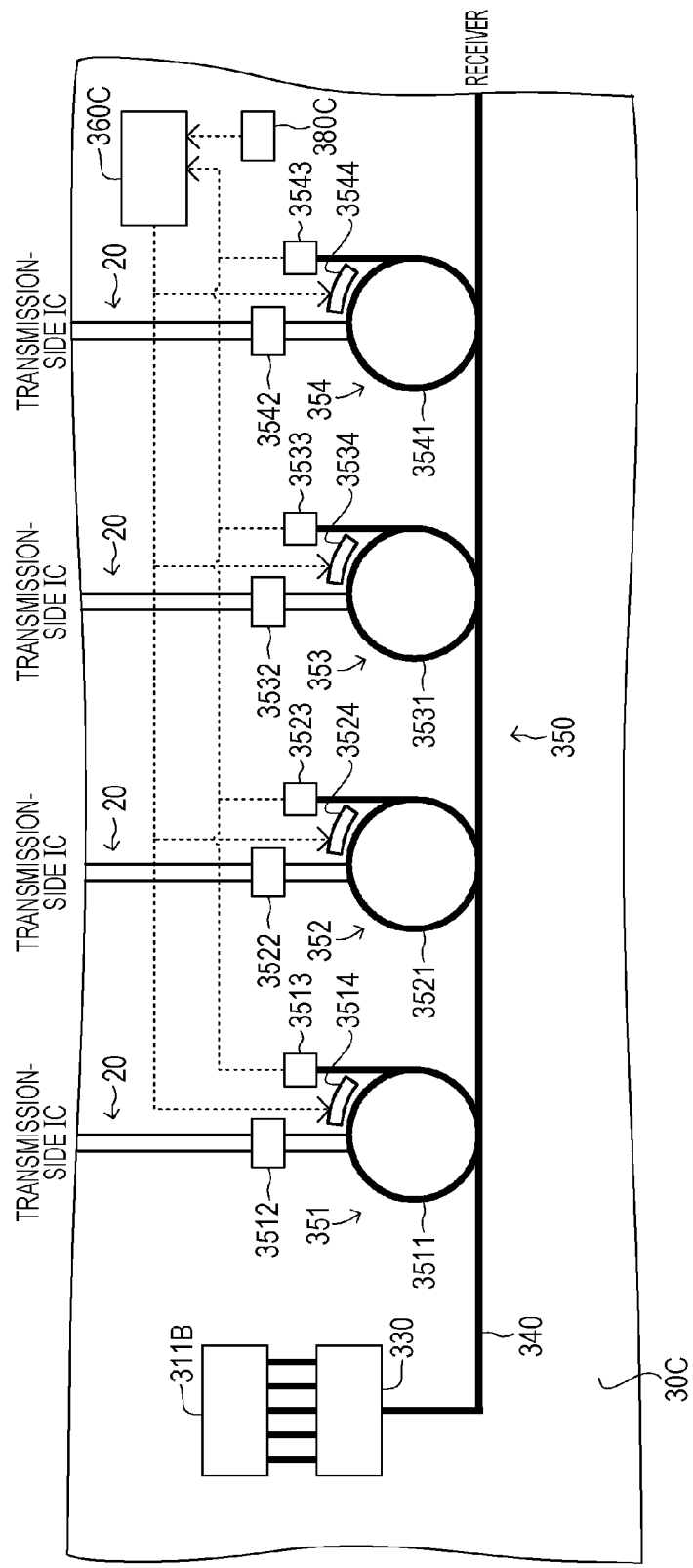
FIG. 11 is a block diagram illustrating a configuration example of a transmitter in a first modification example of the third embodiment.

As illustrated in FIG. 11, a transmitter 30C in the first modification example of the third embodiment includes a control section 360C and a temperature sensor 380C in place of the control section 360B in FIG. 9. The control section 360C is an example of a first control section.

The wavelength of the light wave output from the first light source section 311B varies depending on the temperature of the first light source section 311B. The temperature of the first light source section 311B is closely correlated with the temperature of the transmitter 30C. Therefore, a relation between the temperature of the transmitter 30C and the voltage applied to the heaters 3514 to 3544 when the resonant wavelengths of the modulators 351 to 354 match the auxiliary wavelength is previously found, and the voltage applied to the heaters 3514 to 3544 can be determined based on the relation.

The temperature sensor 380C detects the temperature of the transmitter 30C.

The control section 360C holds a first relation between the temperature detected by the temperature sensor 380C and the voltage applied to the heaters 3514 to 3544 when the resonant wavelengths of the modulators 351 to 354 match the auxiliary wavelength.

The first relation may be previously held. The control section 360C may acquire the first relation at manufacturing of the optical transmission system 1, at shipment of the optical transmission system 1, or a predetermined time before operation of the optical transmission system 1. For example, the first relation a plurality of different temperatures and voltages corresponding to the temperatures. The first relation may be held as information in a table, and information on a formula for calculating voltage, or combination thereof.

When abnormality is detected in the light wave of wavelength #i, the control section 360C determines the voltage applied to the heaters 3514 to 3544 for wavelength #i, based on the held first relation and the temperature detected by the temperature sensor 380C at detection of the abnormality.

As illustrated in FIG. 12, a receiver 50C in the first modification example of the third embodiment includes a control section 530C and a temperature sensor 540C in place of the control section 530B in FIG. 10. The control section 530C is an example of a second control section. The temperature sensor 540C is an example of a second detection section.

The receiver 50C does not detect the temperature of the transmitter 30C. The temperature of the receiver 50C is closely correlated with the temperature of the transmitter 30C. Thus, the voltage applied to the heaters 5214 to 5244 can be determined based on the temperature of the receiver 50C.

The temperature sensor 540C detects the temperature of the demultiplexing section 520.

The control section 530C holds a first temperature detected by the temperature sensor 540C at a predetermined first time. The first time may be at the time of manufacturing of the optical transmission system 1, at the time of shipment of the optical transmission system 1, or at a predetermined time before operation of the optical transmission system 1.

Further, the control section 530C acquires the voltage applied to the heaters 5214 to 5244 in the case where the resonant wavelengths of the demultiplexers 521 to 524 match the auxiliary wavelength at the first time, and holds the acquired voltage.

When abnormality is detected in the light wave of wavelength #i, the control section 530C acquires a voltage $V_r(t_2)$ applied to the heaters 5214 to 5244 for wavelength #i, based on a second temperature detected by the temperature sensor 540C at a second time when abnormality is detected, and Formula 1.

$$V_r(t_2)=V_r(t_1)+F(T(t_2)-T(t_1))$$ [Formula 1]

$t_1$ and $t_2$ denote the first time and the second time, respectively. $T(t_1)$ and $T(t_2)$ denote the first temperature and the second temperature, respectively. $V_r(t_1)$ denotes the voltage applied to the heaters 5214 to 5244 for wavelength #i in the case where the resonant wavelengths of the demultiplexers 521 to 524 for wavelength #i match the auxiliary wavelength at the first time. F denotes a function that represents the second relation between the temperature of the demultiplexers 521 to 524 and the voltage applied to the heaters 5214 to 5244, and converts temperature into voltage.

The control section 530C may previously hold information on F. Alternatively, the control section 530C may acquire the information on F at manufacturing of the optical transmission system 1, at shipment of the optical transmission system 1, or a predetermined time before operation of the optical transmission system 1. In this case, the temperature detected by the temperature sensor 540C may be used as the temperature of the demultiplexers 521 to 524.

Therefore, when abnormality is detected in the light wave of wavelength #1, the optical transmission system 1 in the first modification example of the third embodiment can rapidly match the resonant wavelength of the ring resonator 3511 in the modulator 351 with the auxiliary wavelength.

Further, when abnormality is detected in the light wave of wavelength #1, the optical transmission system 1 in the first modification example of the third embodiment can rapidly match the resonant wavelength of the resonator 5211 in the demultiplexer 521 with the auxiliary wavelength.

This can restrain a decrease in the transmission rate.

The control section 530C may determine the voltage Vr(t2) applied to the heaters 5214 to 5244 for wavelength #i having abnormality according to Formula 2 in place of Formula 1.

$$V_r(t_2) = V_r(t_1) + F(F^{-1}(V_k(t_2) - V_k(t_1)) - T(t_2) - T(t_1))$$ [Formula 2]

$F^{-1}$ is an inverse function of F. $V_k(t_1)$ denotes the voltage applied to the heaters 5214 to 5244 for wavelength #i in the case where the resonant wavelengths of the demultiplexers 521 to 524 for wavelength #i match the current wavelength (in other words, wavelength #i) at the first time. $V_k(t_2)$ denotes the voltage applied to the heaters 5214 to 5244 for wavelength #i in the case where the resonant wavelengths of the demultiplexers 521 to 524 for wavelength #i match the current wavelength (in other words, wavelength #i) at the second time. $V_k(t_1)$ and $V_k(t_2)$ may be acquired by the control section 530C, and the acquired values may be held in the control section 530C.

Therefore, even when the wavelength of the light wave from the first light source section 311B varies with a change in the temperature of the first light source section 311B, the resonant wavelengths of the ring resonators 5211 to 5241 can be rapidly matched with the auxiliary wavelength.

The control section 530C may determine the voltage $V_r(t_2)$ applied to the heaters 5214 to 5244 for wavelength #i having abnormality according to Formula 3 in place of Formula 2.

$$V_r(t_2) = V_r(t_1) + F\left(\frac{\frac{d\lambda_r}{dT}}{\frac{d\lambda_k}{dT}} F^{-1}(V_k(t_2) - V_k(t_1)) - T(t_2) - T(t_1)\right)$$ [Formula 3]

$d\lambda_r/dT$ denotes a change rate of the wavelength of the light wave from the first light source section 311B as the light wave of redundant wavelength with respect to the temperature. $d\lambda_k/dT$ denotes a change rate of the wavelength of the light wave from the first light source section 311B as the light wave of wavelength #i with respect to the temperature.

$d\lambda_r/dT$ and $d\lambda_k/dT$ may be acquired by the control section 360C of the transmitter 30C, and the acquired values may be held in the control section 360C. $d\lambda_r/dT$ and $d\lambda_k/dT$ may be acquired at manufacturing of the optical transmission system 1, at shipment of the optical transmission system 1, or a predetermined time before operation of the optical transmission system 1. Information on $d\lambda_r/dT$ and $d\lambda_k/dT$ may be transmitted from the transmitter 30C to the receiver 50C at a predetermined time before activation of the optical transmission system 1. The information on $d\lambda_r/dT$ and $d\lambda_k/dT$ may be transmitted by Inter-Integrated Circuit (I2C) communication.

Therefore, even when the change rate of the wavelength of the light wave from the first light source section 311B with respect to temperature varies depending on wavelength, the resonant wavelengths of the ring resonators 5211 to 5241 can be rapidly matched with the auxiliary wavelength.

The control section 530C may determine the voltage $V_r(t_2)$ applied to the heaters 5214 to 5244 for wavelength #i having abnormality according to Formula 4 in place of Formula 3.

$$V_r(t_2) = V_r(t_1) + F_k\left(\frac{\frac{d\lambda_r}{dT}}{\frac{d\lambda_k}{dT}} F_k^{-1}(V_k(t_2) - V_k(t_1)) - T(t_2) - T(t_1)\right)$$ [Formula 4]

$F_k$ denotes a function that represents the second relation of the demultiplexers 521 to 524 for the wavelength #i having abnormality among the plurality of demultiplexers 521 to 524, and converts temperature into voltage.

The control section 530C may previously hold information on $F_k$. The control section 530C may acquire the information on $F_k$ at manufacturing of the optical transmission system 1, at shipment of the optical transmission system 1, or a predetermined time before operation of the optical transmission system 1. In this case, the temperature detected by the temperature sensor 540C may be used as the temperature of the demultiplexers 521 to 524.

Therefore, even when the second relation varies among the demultiplexers, the resonant wavelengths of the ring resonators 5211 to 5241 can be rapidly matched with the auxiliary wavelength.

In the optical transmission system 1 according to the first embodiment, the wavelength of the light wave from the first light source section 311 may be slightly different from the wavelength of the light wave from the second light source section 312. In this case, to adjust wavelength after switching of the light source, temperature control in the first modification example of the third embodiment can be performed.

The optical transmission system 1 according to each embodiment may be combined with at least one of the optical transmission systems 1 in the other embodiments.

The optical transmission system 1 according to each embodiment is used in the optical interconnect, but may be used for optical communication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

Additional Note 1. An optical transmission system for transmitting a multiplexed optical signal including optical signals of a plurality of different wavelengths by using an optical element made of a material containing silicon, the optical transmission system comprising: a first light source configured to output a light wave of a first wavelength among the plurality of wavelengths; a second light source configured to output a light wave of a second wavelength; and a first detection section configured to detect abnormality in the light wave from the first light source, wherein upon detection of the abnormality, the multiplexed optical signal including an optical signal of a modulated light wave generated using the light wave from the second light source in place of an optical signal of a modulated light wave generated using the light wave from the first light source is transmitted.

Additional Note 2. The optical transmission system according to additional note 1, further comprising a modulation section configured to modulate at least one of the input light waves of the plurality of wavelengths to generate the optical signals of the plurality of wavelengths, and upon detection of the abnormality, modulate the light wave from the second light source in place of the light wave from the first light source.

Additional Note 3. The optical transmission system according to additional note 2, wherein the second wavelength is identical to the first wavelength, and the optical transmission system further comprises a first switch configured to switch the light wave to be output to the modulation section from the light wave from the first light source to the light wave from the second light source, upon detection of the abnormality.

Additional Note 4. The optical transmission system according to additional note 3, further comprising: a first light source section including the first light source and configured to output each of the light waves of the plurality of wavelengths; and a second light source section including the second light source and configured to output each of the light waves of the plurality of wavelengths, wherein the first detection section detects abnormality in each of the light waves of the plurality of wavelengths from the first light source section, and upon detection of the abnormality in any one of the plurality of wavelengths, the first switch switches the light wave of the wavelength to be output to the modulation section from the light wave from the first light source section to the light wave from the second light source section.

Additional Note 5. The optical transmission system according to additional note 2, wherein the second wavelength is a wavelength other than the first wavelength among the plurality of wavelengths, the light wave from the first light source and the light wave from the second light source are input to the modulation section, and the optical transmission system further comprises a demultiplexing section configured to separate an optical signal from the transmitted multiplexed optical signal for each of at least one of the plurality of wavelengths, and output reception electric signals corresponding to the separated optical signals, and upon detection of the abnormality, switch the electric signals output as the reception electric signals from the electric signals corresponding to the separated optical signals for the first wavelength to the electric signals corresponding to the separated optical signals for the second wavelength.

Additional Note 6. The optical transmission system according to additional note 5, wherein the modulation section includes: a first modulator configured to modulate the light wave of the first wavelength according to an input transmission electric signal; a second modulator configured to modulate the light wave of the second wavelength according to the input transmission electric signals; and a second switch configured to switch the modulator receiving the transmission electric signals from the first modulator to the second modulator, upon detection of the abnormality.

Additional Note 7. The optical transmission system according to additional note 5, wherein the demultiplexing section includes: a first demultiplexer configured to separate an optical signal of the first wavelength from the transmitted multiplexed optical signal; a second demultiplexer configured to separate an optical signal of the second wavelength from the transmitted multiplexed optical signal; and a third switch configured to switch the electric signals output as the reception electric signals from the electric signal corresponding to the optical signal separated by the first demultiplexer to the electric signal corresponding to the optical signal separated by the second demultiplexer, upon detection of the abnormality.

Additional Note 8. The optical transmission system according to additional note 5, wherein the modulation section include a modulator including a ring resonator and configured to modulate the light wave of the first wavelength, the ring resonator being configured to resonate with the first wavelength, and the optical transmission system further comprises a first control section configured to control a temperature of the ring resonator included in the modulator, upon detection of the abnormality, such that the resonant wavelength of the ring resonator matches the second wavelength.

Additional Note 9. The optical transmission system according to additional note 5, wherein the demultiplexing section includes a demultiplexer including a ring resonator and configured to separate the optical signals of the first wavelength from the transmitted multiplexed optical signal, the ring resonator being configured to resonate with the first wavelength, and the optical transmission system further comprises a second control section configured to control a temperature of the ring resonator included in the demultiplexer, upon detection of the abnormality, such that the resonant wavelength of the ring resonator matches the second wavelength.

Additional Note 10. The optical transmission system according to additional note 9, further comprising a second detection section configured to detect a temperature of the demultiplexing section, wherein the second control section includes a temperature regulator configured to change in temperature according to an applied voltage, and the voltage applied to the temperature regulator is determined based on a first temperature detected at a predetermined first time, a second temperature detected at a second time when the abnormality is detected, and the voltage applied to the temperature regulator in the case where the resonant wavelength of the ring resonator included in the demultiplexer matches the second wavelength at the first time.

Additional Note 11. The optical transmission system according to additional note 10, wherein the voltage is determined based on the voltage applied to the temperature regulator in the case where the resonant wavelength of the ring resonator included in the demultiplexer matches the first wavelength at each of the first time and the second time.

Additional Note 12. The optical transmission system according to additional note 10, wherein the second control section previously holds a relation between the voltage applied to the temperature regulator and the temperature of the demultiplexing section, and the voltage is determined based on the held relation.

Additional Note 13. The optical transmission system according to additional note 10, wherein the voltage is determined based on a change rate of the wavelength of the light wave output from the first light source with respect to temperature, and a change rate of the wavelength of the light wave output from the second light source with respect to temperature.

Additional Note 14. A transmitter for transmitting a multiplexed optical signal including optical signals of a plurality of different wavelengths by using an optical element made of a material containing silicon, the transmitter comprising: a first light source configured to output a light wave of a first wavelength among the plurality of wavelengths; a second light source configured to output a light wave of a second wavelength; and a first detection section configured to detect abnormality in the light wave from the first light source, wherein upon detection of the abnormality, the multiplexed optical signal including an optical signal of a modulated light wave generated using the light from the second light source in place of an optical signal of a modulated light wave generated using the light from the first light source is transmitted.

Additional Note 15. The transmitter according to additional note 14, further comprising a modulation section configured to modulate at least one of the input light waves of the plurality of wavelengths to generate the optical signals of the plurality of wavelengths, and upon detection of the abnormality, modulate the light wave from the second light source in place of the light wave from the first light source.

Additional Note 16. The transmitter according to additional note 15, wherein the second wavelength is identical to the first wavelength, and the transmitter further comprises a first switch configured to switch the light wave to be output to the modulation section from the light wave from the first light source to the light wave from the second light source, upon detection of the abnormality.

Additional Note 17. The transmitter according to additional note 15, wherein the second wavelength is a wavelength other than the first wavelength among the plurality of wavelengths, and the light wave from the first light source and the light wave from the second light source are input to the modulation section.

Additional Note 18. The transmitter according to additional note 17, wherein the modulation section includes: a first modulator configured to modulate the light wave of the first wavelength according to an input transmission electric signal; a second modulator configured to modulate the light wave of the second wavelength according to the input transmission electric signal; and a second switch configured to switch the modulator receiving the transmission electric signal from the first modulator to the second modulator, upon detection of the abnormality.

Additional Note 19. The transmitter according to additional note 17, wherein the modulation section include a modulator including a ring resonator and configured to modulate the light wave of the first wavelength, the ring resonator being configured to resonate with the first wavelength, and the transmitter further comprises a first control section configured to control a temperature of the ring resonator included in the modulator, upon detection of the abnormality, such that the resonant wavelength of the ring resonator matches the second wavelength.

Additional Note 20. A receiver for receiving a multiplexed optical signal including optical signals of a plurality of different wavelengths by using an optical element made of a material containing silicon, the receiver comprising a first detection section configured to detect abnormality in a light wave of a first wavelength among the plurality of wavelengths, wherein upon detection of the abnormality, the receiver receives the multiplexed optical signal including an optical signal of the modulated light wave of a second wavelength other than the first wavelength among the plurality of wavelengths in place of the optical signal of the modulated light wave of the first wavelength.

Additional Note 21. The receiver according to additional note 20, further comprising a demultiplexing section configured to separate an optical signal from the transmitted multiplexed optical signal for each of at least one of the plurality of wavelengths, and output reception electric signals corresponding to the separated optical signals, and upon detection of the abnormality, switch the electric signal output as the reception electric signal from the electric signal corresponding to the separated optical signal for the first wavelength to the electric signal corresponding to the separated optical signal for the second wavelength.

Additional Note 22. The receiver according to additional note 21, wherein the demultiplexing section includes: a first demultiplexer configured to separate an optical signal of the first wavelength from the transmitted multiplexed optical signal; a second demultiplexer configured to separate an optical signal of the second wavelength from the transmitted multiplexed optical signal; and a third switch configured to switch the electric signal output as the reception electric signal from the electric signal corresponding to the optical signal separated by the first demultiplexer to the electric signal corresponding to the optical signal separated by the second demultiplexer, upon detection of the abnormality.

Additional Note 23. The receiver according to additional note 21, wherein the demultiplexing section includes a demultiplexer including a ring resonator and configured to separate the optical signals of the first wavelength from the transmitted multiplexed optical signal, the ring resonator being configured to resonate with the first wavelength, and the receiver further comprises a second control section configured to control a temperature of the ring resonator included in the demultiplexer, upon detection of the abnormality, such that the resonant wavelength of the ring resonator matches the second wavelength.

Additional Note 24. An optical transmission method for transmitting a multiplexed optical signal composed of optical signals of a plurality of different wavelengths by using an optical element made of a material containing silicon, the optical transmission method comprising: detecting abnormality in light from a first light source configured to output light of a first wavelength among the plurality of wavelengths; and upon detection of the abnormality, transmitting the multiplexed optical signal including an optical signal of a modulated light generated using the light from a second light source configured to output light of a second wavelength in place of an optical signal of a modulated light generated using the light from the first light source.

What is claimed is:

1. An optical transmission system for transmitting a multiplexed optical signal including optical signals of a plurality of different wavelengths by using an optical element made of a material containing silicon, the optical transmission system comprising:
    a first light source configured to output a light wave of a first wavelength among the plurality of wavelengths;
    a second light source configured to output a light wave of a second wavelength;
    a first detection section configured to detect abnormality in the light wave from the first light source,
    wherein:
        the abnormality in the light wave from the first light source is detected based on a determination that a detected light intensity from the first light source is less than a predetermined threshold,
        the first light source, the second light source, and the first detection section each are made of a material containing silicon, and
        upon detection of the abnormality, the multiplexed optical signal including an optical signal of a modulated light wave generated using the light wave from the second light source in place of an optical signal of a modulated light wave generated using the light wave from the first light source is transmitted; and
    a modulation section configured to modulate at least one of the input light waves of the plurality of wavelengths to generate the optical signals of the plurality of wavelengths, and upon detection of the abnormality, modulate the light wave from the second light source in place of the light wave from the first light source;
wherein:
the second wavelength is a wavelength other than the first wavelength among the plurality of wavelengths,
the light wave from the first light source and the light wave from the second light source are input to the modulation section, and
a demultiplexing section configured to separate an optical signal from the multiplexed optical signal for each of at least one of the plurality of wavelengths and output reception electric signals corresponding to the separated optical signals; and
wherein the demultiplexing section includes:
a first demultiplexer configured to separate an optical signal of the first wavelength from the received multiplexed optical signal,
a second demultiplexer configured to separate an optical signal of the second wavelength from the received multiplexed optical signal, and
a first switch configured to switch electric signals output as the reception electric signals, from the electric signal corresponding to the optical signal separated by the first demultiplexer to the electric signal corresponding to the optical signal separated by the second demultiplexer, upon detection of the abnormality.

2. The optical transmission system according to claim 1, wherein:
the second wavelength is identical to the first wavelength, and
the optical transmission system further comprises a second switch configured to switch the light wave to be output to the modulation section from the light wave from the first light source to the light wave from the second light source, upon detection of the abnormality.

3. The optical transmission system according to claim 2, further comprising:
a first light source section including the first light source and configured to output each of the light waves of the plurality of wavelengths; and
a second light source section including the second light source and configured to output each of the light waves of the plurality of wavelengths, wherein:
the first detection section detects abnormality in each of the light waves of the plurality of wavelengths from the first light source section, and
upon detection of the abnormality in any one of the plurality of wavelengths, the second switch switches the light wave of the wavelength to be output to the modulation section from the light wave from the first light source section to the light wave from the second light source section.

4. The optical transmission system according to claim 1, wherein the modulation section includes:
a first modulator configured to modulate the light wave of the first wavelength according to an input transmission electric signal;
a second modulator configured to modulate the light wave of the second wavelength according to the input transmission electric signals; and
a second switch configured to switch the modulator receiving the transmission electric signals from the first modulator to the second modulator, upon detection of the abnormality.

5. The optical transmission system according to claim 1, wherein:
the modulation section include a modulator including a ring resonator and configured to modulate the light wave of the first wavelength, the ring resonator being configured to resonate with the first wavelength, and
the optical transmission system further comprises a first control section configured to control a temperature of the ring resonator included in the modulator, upon detection of the abnormality, such that the resonant wavelength of the ring resonator matches the second wavelength.

6. The optical transmission system according to claim 1, wherein:
the demultiplexing section includes a demultiplexer including a ring resonator and configured to separate the optical signals of the first wavelength from the multiplexed optical signal, the ring resonator being configured to resonate with the first wavelength, and
the optical transmission system further comprises a first control section configured to control a temperature of the ring resonator included in the demultiplexer, upon detection of the abnormality, such that the resonant wavelength of the ring resonator matches the second wavelength.

7. The optical transmission system according to claim 6, further comprising a second detection section configured to detect a temperature of the demultiplexing section, wherein:
the first control section includes a temperature regulator configured to change temperature according to an applied voltage, and
the voltage applied to the temperature regulator is determined based on a first temperature detected at a predetermined first time, a second temperature detected at a second time when the abnormality is detected, and the voltage applied to the temperature regulator in the case where the resonant wavelength of the ring resonator included in the demultiplexer matches the second wavelength at the first time.

8. The optical transmission system according to claim 7, wherein the voltage is determined based on the voltage applied to the temperature regulator in the case where the resonant wavelength of the ring resonator included in the demultiplexer matches the first wavelength at each of the first time and the second time.

9. The optical transmission system according to claim 7, wherein:
the first control section is configured to store a relation between the voltage applied to the temperature regulator and the temperature of the demultiplexing section, and
the voltage is determined based on the stored relation.

10. The optical transmission system according to claim 7, wherein the voltage is determined based on a change rate of the wavelength of the light wave output from the first light source with respect to temperature, and a change rate of the wavelength of the light wave output from the second light source with respect to temperature.

11. A transmitter for transmitting a multiplexed optical signal including optical signals of a plurality of different wavelengths by using an optical element made of a material containing silicon to a receiver, the transmitter comprising:
a first light source configured to output a light wave of a first wavelength among the plurality of wavelengths;
a second light source configured to output a light wave of a second wavelength;

a first detection section configured to detect abnormality in the light wave from the first light source, wherein:
the abnormality in the light wave from the first light source is detected based on a determination that a detected light intensity from the first light source is less than a predetermined threshold, the first light source, the second light source, and the first detection section each are made of a material containing silicon, and upon detection of the abnormality, the multiplexed optical signal including an optical signal of a modulated light wave generated using the light from the second light source in place of an optical signal of a modulated light wave generated using the light from the first light source is transmitted; and a modulation section configured to modulate at least one of the input light waves of the plurality of wavelengths to generate the optical signals of the plurality of wavelengths, and upon detection of the abnormality, modulate the light wave from the second light source in place of the light wave from the first light source;

wherein:
the second wavelength is a wavelength other than the first wavelength among the plurality of wavelengths, and the light wave from the first light source and the light wave from the second light source are input to the modulation section;

wherein the receiver comprises a demultiplexing section configured to separate an optical signal from the multiplexed optical signal for each of at least one of the plurality of wavelengths and output reception electric signals corresponding to the separated optical signals; and wherein the demultiplexing section of the receiver includes:
a first demultiplexer configured to separate an optical signal of the first wavelength from the multiplexed optical signal, a second demultiplexer configured to separate an optical signal of the second wavelength from the multiplexed optical signal, and a first switch configured to switch electric signals output as the reception electric signals, from the electric signal corresponding to the optical signal separated by the first demultiplexer to the electric signal corresponding to the optical signal separated by the second demultiplexer, upon detection of the abnormality.

12. The transmitter according to claim 11, wherein:
the second wavelength is identical to the first wavelength, and the transmitter further comprises a second switch configured to switch the light wave to be output to the modulation section from the light wave from the first light source to the light wave from the second light source, upon detection of the abnormality.

13. The transmitter according to claim 11, wherein:
the second wavelength is a wavelength other than the first wavelength among the plurality of wavelengths, and the light wave from the first light source and the light wave from the second light source are input to the modulation section.

14. The transmitter according to claim 13, wherein:
the modulation section includes:
a first modulator configured to modulate the light wave of the first wavelength according to an input transmission electric signal;

a second modulator configured to modulate the light wave of the second wavelength according to the input transmission electric signal; and a second switch configured to switch the modulator receiving the transmission electric signal from the first modulator to the second modulator, upon detection of the abnormality.

15. The transmitter according to claim 13, wherein the modulation section include a modulator including the ring resonator and is configured to modulate the light wave of the first wavelength, the ring resonator being configured to resonate with the first wavelength, and further comprising a first control section configured to control the temperature of the ring resonator included in the modulator, upon detection of the abnormality, such that the resonant wavelength of the ring resonator matches the second wavelength.

16. A receiver for receiving a multiplexed optical signal including optical signals of a plurality of different wavelengths by using an optical element made of a material containing silicon, the receiver comprising:
a detector configured to detect abnormality in a light wave of a first wavelength among the plurality of wavelengths, the detector being made of a material containing silicon, wherein:
the abnormality of the first wavelength is detected based on a determination that a detected light intensity from a first light source is less than a predetermined threshold, and upon detection of the abnormality, the receiver receives the multiplexed optical signal including an optical signal of modulated light wave of a second wavelength other than the first wavelength among the plurality of wavelengths in place of the optical signal of the modulated light wave of the first wavelength; and a demultiplexing section configured to separate an optical signal from the multiplexed optical signal for each of at least one of the plurality of wavelengths and output reception electric signals corresponding to the separated optical signals;

wherein:
the second wavelength is a wavelength other than the first wavelength among the plurality of wavelengths, and the demultiplexing section includes:
a first demultiplexer configured to separate an optical signal of the first wavelength from the multiplexed optical signal, a second demultiplexer configured to separate an optical signal of the second wavelength from the multiplexed optical signal, and a first switch configured to switch electric signals output as the reception electric signals, from the electric signal corresponding to the optical signal separated by the first demultiplexer to the electric signal corresponding to the optical signal separated by the second demultiplexer, upon detection of the abnormality.

17. An optical communication system for transmitting and receiving a multiplexed optical signal, the optical communication system comprising:

a first light source configured to output a light wave of a first wavelength among a plurality of wavelengths;

a second light source configured to output a light wave of a second wavelength among the plurality of wavelengths, the second light source being configured to act as an auxiliary to the first light source;

a control section configured to detect abnormality in the light wave of the first wavelength from the first light source, a modulation section configured to modulate at least one of input light waves of the plurality of wavelengths to generate optical signals of the plurality of wavelengths, and upon detection of the abnormality, to modulate the light wave from the second light source in place of the light wave from the first light source for transmission of the multiplexed optical signal, wherein when the abnormality in the light wave of the first wavelength from the first light source is detected, the light wave that is to be output to the modulation section is switched from the light wave from the first light source to the light wave from the second light source for transmission of the multiplexed optical signal; and a demultiplexing section configured to: separate an optical signal from the received multiplexed optical signal for each of at least one of the plurality of wavelengths, output reception electric signals corresponding to the separated optical signals, and switch electric signals output as the reception electric signals, wherein the demultiplexing section comprises a first demultiplexer configured to separate an optical signal of a first wavelength from the received multiplexed optical signal, a second demultiplexer configured to separate an optical signal of a second wavelength from the received multiplexed optical signal, and a switch configured to switch the electric signals output as the reception electric signals, from electric signals corresponding to the separated optical signals for the first wavelength to electric signals corresponding to the separated optical signals for the second wavelength, when an abnormality in the light wave of the first wavelength is detected.

18. The optical communication system of claim 17, wherein when the abnormality in the light wave of the first wavelength from the first light source is detected, the control section is further configured to control a temperature of a ring resonator of the modulation section such that a resonant wavelength of the ring resonator matches the second wavelength from the second light source.

* * * * *